(12) United States Patent
Kobayashi et al.

(10) Patent No.: US 6,715,540 B2
(45) Date of Patent: Apr. 6, 2004

(54) AIR-CONDITIONING APPARATUS FOR VEHICLE

(75) Inventors: Ryo Kobayashi, Kariya (JP); Yasushi Yamanaka, Nakashima-gun (JP); Yoshitaka Tomatsu, Chiryu (JP); Satoshi Itoh, Kariya (JP); Motohiro Yamaguchi, Hoi-gun (JP); Satoshi Izawa, Anjo (JP); Yoshiaki Takano, Kosai (JP); Toshitaka Shimizu, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/845,010

(22) Filed: Apr. 27, 2001

(65) Prior Publication Data

US 2001/0035286 A1 Nov. 1, 2001

(30) Foreign Application Priority Data

Apr. 28, 2000 (JP) ........................ 2000-130809
Nov. 2, 2000 (JP) ........................ 2000-336342
Apr. 3, 2001 (JP) ........................ 2001-105158

(51) Int. Cl.$^7$ ................................. B60H 1/00
(52) U.S. Cl. ................... 165/202; 165/42; 165/43; 165/223; 165/231; 165/240; 237/2 A; 237/2 B
(58) Field of Search ................. 165/42, 43, 202, 165/223, 231, 240; 237/2 A, 2 B

(56) References Cited

U.S. PATENT DOCUMENTS

| 4,382,463 | A | * | 5/1983 | Ikebukuro | ............... 165/223 X |
| 4,852,363 | A | * | 8/1989 | Kampf et al. | ........... 165/223 X |
| 4,882,908 | A | * | 11/1989 | White | |
| 4,920,755 | A | * | 5/1990 | Tadahiro | ................. 165/223 X |
| 5,598,887 | A | * | 2/1997 | Ikeda et al. | ............. 165/240 X |
| 5,706,664 | A | * | 1/1998 | Hara | ...................... 165/240 X |
| 5,749,235 | A | * | 5/1998 | Ueda | |
| 5,782,102 | A | * | 7/1998 | Iritani et al. | |
| 5,799,728 | A | * | 9/1998 | Blume | ........................ 165/231 |
| 5,878,589 | A | * | 3/1999 | Tanaka et al. | |
| 5,878,810 | A | * | 3/1999 | Saito et al. | ................. 165/240 |
| 6,041,849 | A | * | 3/2000 | Karl | ....................... 165/202 X |
| 6,047,770 | A | * | 4/2000 | Suzuki et al. | |
| 6,105,666 | A | * | 8/2000 | Tajima et al. | |
| 6,109,533 | A | * | 8/2000 | Ao et al. | ................. 165/240 X |
| 6,125,643 | A | * | 10/2000 | Noda et al. | ............. 165/202 X |
| 6,289,685 | B1 | * | 9/2001 | Utsumi et al. | .......... 165/240 X |

FOREIGN PATENT DOCUMENTS

| JP | A-B2-5-39807 | 6/1993 |
| JP | A-6-344764 | 12/1994 |

* cited by examiner

*Primary Examiner*—L V Ciric
(74) *Attorney, Agent, or Firm*—Harness, Dickey & Pierce, PLC

(57) ABSTRACT

The air heating capability of an indoor heat exchanger is limited to set the temperature of the indoor heat exchanger to a first predetermined temperature Te1 or lower during heating. Thereby, fogging is prevented through re-evaporation of the condensed water in the indoor heat exchanger during heating within an air-conditioning apparatus with a hot water heater core using hot water as the heat source and the heating circuit.

10 Claims, 15 Drawing Sheets

AIR-CONDITIONING APPARATUS FOR VEHICLE

CROSS-REFERENCE TO RELATED APPLICATION

The present invention relates to an air-conditioning apparatus for heating the compartment within a vehicle with a hot water heating apparatus, and more particularly to an air conditioning apparatus that prevents window fogging due to re-evaporation of condensation water.

FIELD OF THE INVENTION

The present invention relates to an air-conditioning apparatus for heating the compartment within a vehicle through with a hot water heating apparatus, and more particularly to an air conditioning apparatus that prevents window fogging due to re-evaporation of condensation water.

BACKGROUND OF THE INVENTION

A hot-water heating apparatus has been used to heat air with a heater core using hot-water as a heat source by circulating the hot-water (engine coolant) through the heater core during vehicle compartment heating during winter. In this case, when the hot-water temperature is low, the air outlet temperature is also low and thereby not attaining sufficient heating.

Therefore, JP-B2-5-39807 discloses a heating circuit further combined with a hot-water heating apparatus to operate a heating circuit when the air outlet temperature of the hot water heater core or hot-water temperature is lower than a predetermined temperature and to improve heating capability by heating air passing through the hot water heater core with an indoor heat exchanger and heating circuit.

In some cases, an air-conditioning mode is set to filter external air during heating in winter. In this case, the air must be cooled and dehumidified to prevent fogging. Therefore, the indoor heat exchanger is operated as an evaporator for operating the heating circuit to cool air until the external air temperature is lowered up to about 0° C.

Therefore, in some cases, the heating circuit is operated for heating because the heating capability is reduced after the heating circuit cools to prevent fogging when the external air temperature is about 0° C. Moreover, in some cases, the heating circuit is stopped after cooling and then started again to heat.

In the above cases, since the condensed water generated during cooling remains on the surface of the indoor heat exchanger, if the heating circuit is operated to heat, the indoor heat exchanger radiates the heat as a high pressure side heat exchanger (heat radiator of coolant gas) and thereby rapidly increasing the temperature of the indoor heat exchanger. As such, the condensed water on the surface of the indoor heat exchanger is re-evaporated and is blown into the vehicle compartment, thereby causing fogging.

Moreover, the condensed water generated during cooling with the indoor heat exchanger is not easily evaporated at the lower external air temperature during winter and thereby remains for a long time. Therefore, fogging is sometimes caused when heating begins with the heating circuit even after a certain period of time has passed after switching to cooling.

SUMMARY OF THE INVENTION

The present invention provides an air-conditioning apparatus for heating a vehicle compartment with a hot-water heating apparatus using hot-water as the heat source and using a heating circuit to defog with re-evaporation of condensed water in the indoor heat exchanger during heating circuit heating.

In one aspect of the invention, an indoor heat exchanger operates as a low pressure side heat exchanger during the heating circuit cooling and as a high pressure side heat exchanger during heating circuit heating. A heater core is positioned downstream of the indoor heat exchanger to heat the air using the hot-water as the heat source, whereby the air heating capability of the indoor heat exchanger is limited so that the temperature of indoor heat exchanger becomes lower than the first predetermined temperature during heating circuit heating.

Accordingly, the temperature of the indoor heat exchanger is maintained lower than the first predetermined temperature (Te1) during the air heating operation. Therefore, re-evaporation of the condensed water on the surface of the indoor heat exchanger can be suppressed during heating. Therefore, fogging resulting from the highly humidified air is suppressed by setting the first predetermined temperature (Te1) to a low temperature such that the condensed water is not easily re-evaporated, for instance 10° C.

As a supply source of the hot-water to the heater core, a fuel battery or the like can be used in addition to the vehicle engine.

In another aspect, the present invention includes a determining means to determine whether the vehicle window glass is fogged or not to limit the air heating capability of the indoor heat exchanger when the determining means determines that the window glass is fogged.

Accordingly, when it is determined that the window glass is fogged during heating, the air heating capability of the indoor heat exchanger is limited to reduce blowing highly humidified air to suppress fogging. Moreover, when window glass is not fogged, this action is cancelled.

In another aspect, a determining means can determine whether fogging has occurred based on humidity near the windows as compared with general humidity. Here, humidity near the windows can be calculated (estimated) from the vehicle environment and operating conditions of the air-conditioning apparatus, in addition to the direct detection with a humidity sensor. For example, humidity of the indoor air near the window glass can be calculated (estimated) based on the physical amount in relation to the temperature of window glass. The physical amount in relation to the temperature of window glass can also be calculated (estimated) from the temperature of the window glass and some other physical quantity such as external air temperature, vehicle speed or the like correlated to the above physical amount.

Moreover, since the indoor air humidity correlates to the temperature near the window glass (when the temperature is higher, relative humidity is lower), air humidity can be estimated from the indoor air temperature near the window glass and this indoor air temperature near the window glass can be estimated from the outlet temperature of the air-conditioning apparatus.

As such, in another aspect, hot-water temperature is used as a physical amount in relation to the indoor air humidity near the window glass and it can be determined that the window glass is fogged when the hot-water temperature is lower than the predetermined hot-water temperature (Two). Namely, since the outlet temperature of the air-conditioning apparatus changes depending on the temperature of hot-water circulating in the heater core, it is determined whether the window glass is fogged or not based on the hot-water temperature.

In another aspect, the determination level (Two) of the hot-water temperature can be varied depending on the change of the external air temperature closely correlated with the temperature of the window glass and thereby fogging can be determined accurately by compensating the predetermined hot-water temperature (Two) to a higher temperature side through a drop of the external air temperature.

In another aspect, the determining means can determine whether the window glass is fogged based on the record of the heating circuit cooling.

In another aspect, the temperature of the indoor heat exchanger corresponding to an assured resistance pressure (P0) when the indoor heat exchanger operates as a low pressure side heat exchanger is set as a second predetermined temperature (Te2). Thereby, the air heating capability of the indoor heat exchanger is controlled to set the temperature of the indoor heat exchanger higher than the first predetermined temperature (Te1) but lower than the second predetermined temperature (Te2) when the determining means determines that the window glass is not fogged. As such, when the window glass is not fogged, the air heating capability of the heating circuit can be enhanced by setting the temperature of the indoor heat exchanger higher than the first predetermined temperature (Te1). Moreover, the indoor heat exchanger designed as the low pressure side heat exchanger can be preferably utilized for practical use as the high pressure side heat exchanger without any design change to improve the pressure resistance by setting the temperature of the indoor heat exchanger lower than the second predetermined temperature (Te2) corresponding to the assured resistance pressure (P0) of the heat exchanger operating as the low pressure side heat exchanger.

In another aspect, the heating circuit can be stopped when the determining means determines that the window glass is not fogged.

In another aspect, the air heating capability of the indoor heat exchanger can be controlled with a compressor of the heating circuit.

In another aspect, an indoor heat exchanger operates as a low pressure side heat exchanger during heating circuit cooling or as a high pressure side heat exchanger during the air heating operation thereof, a compressor is driven with a vehicle engine to circulate the coolant in the heating circuit and a heater core is positioned downstream of the indoor heat exchanger to heat the air using the hot-water supplied from the vehicle engine as the heat source. Thereby, power to the compressor is increased until the temperature of hot-water rises to the predetermined temperature when heating circuit heating is set.

Thereby, when the hot-water temperature is low, vehicle engine power can be increased. Therefore, rise of hot-water temperature can be accelerated. Accordingly, since the period until the hot-water temperature rises up to the predetermined temperature is shortened, vehicle compartment heating is realized quickly after the vehicle engine has started.

In another aspect, the air heating capability of the indoor heat exchanger is limited to set the temperature of the indoor heat exchanger lower than the predetermined temperature when the engine power increased.

In another aspect, since the temperature of the indoor heat exchanger is maintained under the predetermined temperature (Te1) when engine power is increased, re-evaporation of condensed water on the surface of the indoor heat exchanger can be suppressed during heating. Thereby, fogging due to blowing of highly humidified air is suppressed by setting the predetermined temperature (Te1) lower (such as, for example, 10° C.).

Moreover, since setting the engine power to an increased condition causes the hot-water temperature to rise, the time to limit the air heating capability of the indoor heat exchanger can also be shortened to suppress fogging, helping to quickly increase the vehicle compartment heating.

In another aspect, the hot gas heater cycle that heats with exhaust gas coolant can be set by introducing the exhaust gas coolant of the compressor directly to the indoor heat exchanger and operating the hot gas heater cycle until the hot-water temperature rises to the predetermined temperature under the condition that heating circuit heating is set.

Here, in the hot gas heater cycle, the indoor heat exchanger radiates heat corresponding to the amount of compression work done by compressor. The hot gas heater cycle increases compressor power more than the heating circuit. As vehicle load of engine 22 increases, hot-water temperature rise can be accelerated and the air heating in the vehicle compartment is quickly raised by selecting the hot gas heater cycle when the hot-water temperature is low.

In another aspect, an electric expansion valve is provided to reduce high pressure coolant passing to the indoor heat exchanger to a low pressure coolant during heating circuit heating. As such, an opening angle of the electric expansion valve can be held in the predetermined opening angle or more until the hot-water temperature rises to the predetermined temperature during heating circuit heating.

Thereby, since compressor 11 power can be increased with increased coolant circulation of the heating circuit 10 by increasing the opening angle of the electric expansion valve when the hot-water temperature is low, engine 22 power is increased to increase the hot-water temperature and thereby increase vehicle compartment heating.

In another aspect, high pressure (high pressure coolant temperature) during heating can further be increased by utilizing $CO_2$ as the coolant.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE INVENTION

First Embodiment

Figure 1:
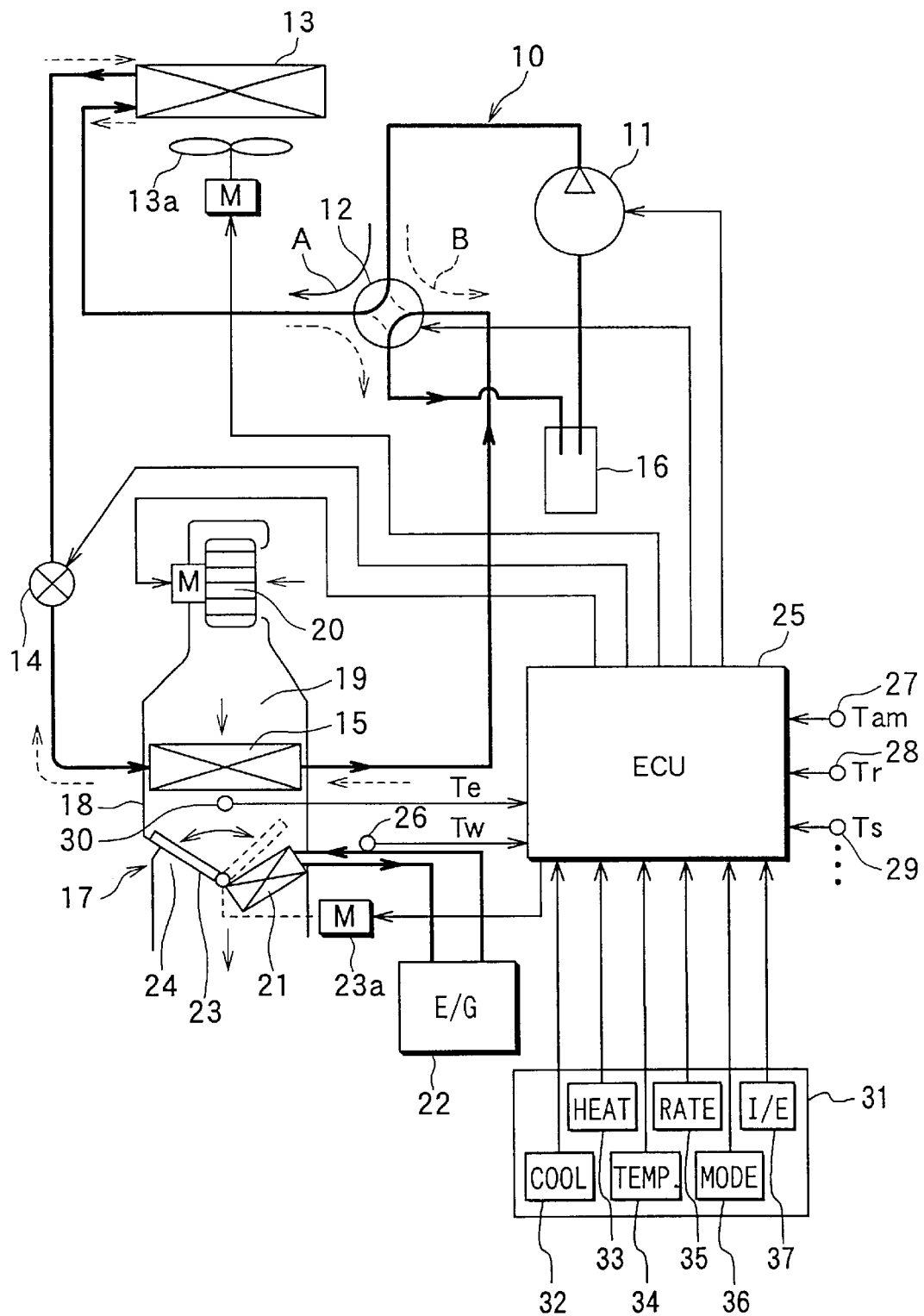
FIG. 1 is a schematic view of a first embodiment of the present invention.

FIG. 1 is a schematic of an air-conditioning apparatus for a vehicle for a first embodiment. Here, a cooling cycle has a heating circuit 10 that can change between the air cooling operation and the air heating operation. The heating circuit 10 of this embodiment is an ultra-critical cooling cycle utilizing $CO_2$ (carbon dioxide) as the coolant. This ultra-critical cooling cycle is disclosed in JP-A No. HEI 5-30326. In some case, the high pressure coolant is used at a pressure higher than critical, and in such a case, the high pressure side coolant is not condensed and radiates heat while in a gaseous state.

The cooling cycle is also referred to as a refrigeration cycle. The heating circuit 10 is also referred to as a heat pump system. The coolant is also referred to as a refrigerant.

Compressor 11 is an electrical compressor driven by a motor and that adjusts the exiting capability (amount of exiting coolant) by controlling the number of motor revolutions (for example, by using an inverter or the like). A four-way valve 12 controls the position of the valve body itself to change the flow direction of the coolant from the exiting side to the intake side. An arrow mark A of the solid line indicates the coolant flow direction during cooling, while arrow B of the broken line indicates coolant flow direction during heating.

An outdoor heat exchanger 13 is positioned within the vehicle engine room together with the compressor 11 for heat exchange with the external air (cooling air) blown with an electric cooling fan 13a. During cooling, the indoor heat exchanger 13 operates as a high pressure side heat exchanger (gas heat radiator) and during heating, the outdoor heat exchanger 13 operates as a low pressure side heat exchanger (evaporator). A decompression apparatus 14 is positioned between the outdoor heat exchanger 13 and the indoor heat exchanger 15 to reduce pressure and expand the high pressure side coolant of the heating circuit to low pressure. This decompression apparatus 14 is formed of a variable throttle and for example is formed of an electric expansion valve that has an electrically adjustable throttle opening angle.

An accumulator 16 is positioned between the four-way valve 12 and the intake side of the compressor 11 to receive the coolant from the evaporator exit (indoor heat exchanger 15 or outdoor heat exchanger 13), reserve the fluid coolant by isolating the fluid of the coolant and cause the compressor 11 to intake the gas coolant and a small amount of fluid coolant (oil is dissolved) existing in the area near the bottom.

An indoor unit 17 of the air-conditioning apparatus for the vehicle has an air-conditioning case 18. This case 18 forms an air path 19 through which the air flows into the compartment of the vehicle. The air is sent with an electric blower 20 positioned in the air-conditioning case 18. At the intake side of the blower 20, a box for switching between internal and external air is provided. Thereby, the internal air (air in the vehicle compartment) or external air (air outside the vehicle compartment) is switched. During heating in winter, the external air is usually introduced into the internal/external air switching box to prevent fogging.

The indoor heat exchanger 15 is positioned downstream of the blower 20 to operate as the low pressure side heat exchanger (evaporator) to which low pressure coolant is supplied during cooling. Therefore, the low pressure coolant absorbs and evaporates heat from the air in the indoor heat exchanger 15 to cool the air blown with blower 23 for air conditioning. Moreover, during heating, the indoor heat exchanger 15 operates as a high pressure side heat exchanger (gas coolant heat radiator) to which high pressure coolant gas in the exiting side of the compressor 11 is directly supplied and heats the blowing air when the high pressure coolant gas radiates the heat to the blowing air.

In the air-conditioning case 18, heater core 21 is provided downstream of the indoor heat exchanger 15 and it exchanges with hot-water to heat air with hot engine water from the vehicle engine.

This embodiment can be applied to a hybrid vehicle having an electric engine. Therefore, the vehicle engine 22 is driven to drive accessories such as the engine or mobile power generator or the like.

An air-mixing door 23 is a temperature adjusting means for the air blowing into the vehicle compartment to adjust the air outlet temperature by adjusting the amount of cool air passing through the bypass path 24 of the heater core 21 and the amount of hot air passing through the heater core 21. The air-mixing door 23 is opened or closed with a driving device 23a preferably consisting of a servo-motor.

The air-conditioning case 18 is provided with an outlet (not illustrated) for supplying air-conditioning air to the vehicle compartment downstream of the heater core 21. As the outlets, a foot outlet for blowing air toward passenger feet, a face outlet for blowing air toward passenger's faces and a defroster outlet for blowing air toward the internal surface of the window glass is respectively provided. These outlets are opened or closed based on a blow mode switching door not illustrated.

An electronic control unit for air-conditioning (hereinafter referred to as ECU) 25 is formed of a microcomputer and its peripheral circuits to execute the arithmetic operation process for an input signal depending on preset program to control the RPM of the compressor 11, switching of the four-way valve 12 and other electric apparatuses (13a, 14, 20, 23a or the like).

Detected signals are input to the ECU 25 from a sensor group including water temperature sensor 26 for detecting the hot-water temperature Tw of vehicle engine 22, an external air temperature sensor 27, an internal air temperature sensor 28, a sun-shine sensor 29 and a air outlet temperature sensor 30 for detecting the indoor heat exchanger 15 temperature or the like.

Moreover, an operation signal is input to the ECU 25 from operation switches of the air-conditioning operation panel 31 provided near the instrument panel in the vehicle compartment. Such switches include, an air-conditioning switch 32 for driving compressor 11 and also switching the four-way valve 12 to the air cooling condition of the heating circuit 10, an air heating switch 33 for driving the compressor 11 of the cooling cycle and also switching the four-way valve 12 to the air heating condition of the heating circuit 10, a temperature setting switch 34 for setting the desired temperature in the vehicle compartment, a blowing rate change-over switch 35, a blowing mode change-over switch 36 and an internal/external air change-over switch 37 or the like.

Next, operations of the first embodiment of the structure explained above will be described. First, operation of the air cooling cycle of the heating circuit 10 will be explained. During cooling, the four-way valve 12 is operated as indicated with a solid line of FIG. 1 with the ECU 25. The exit gas coolant from compressor 11 is first input into the outdoor heat exchanger 13 via the four-way valve 12.

In the outdoor heat exchanger 13, the gas coolant is cooled to radiate heat with the external air blown with the cooling fan 13a. When a cycle heat load is large, pressure of the high pressure coolant passing in outdoor heat exchanger 13 reaches the ultra-critical condition that is higher than the critical pressure. Thereby, the coolant radiates heat while in the gaseous condition. On the other hand, when the cycle heat load is small, the high pressure coolant has a lower pressure than the critical pressure and is then condensed in the outdoor heat exchanger 13.

The coolant having passed the outdoor heat exchanger 13 is decompressed with a decompressor 14 formed of an electric expansion valve to become a 2-phase gas and fluid having a lower temperature and pressure.

Next, this low pressure coolant enters the indoor heat exchanger 15, absorbs the heat from the air-conditioning air blown from a blower 20 and is then evaporated. The air-conditioning air cooled in the indoor heat exchanger 15 is blown into the vehicle compartment for cooling. The gas coolant evaporated in the indoor heat exchanger 15 passes the four-way valve 12, enters the compressor 11 via an accumulator 16 and is then compressed.

During heating during winter, the four-way valve 12 is operated with the ECU 25 as indicated by a broken line of FIG. 1. The exhaust gas coolant of the compressor 11 first passes the four-way valve 12 and then enters the indoor heat exchanger 15. Therefore, high temperature exhaust gas coolant (over-heat gas coolant) of the compressor 11 radiates heat to air in the indoor heat exchanger 15 for heating.

The coolant, having passed the indoor heat exchanger 15, is decompressed in the decompressor 14 to become 2-phase gas and fluid having a low temperature and pressure. This low pressure coolant absorbs heat from external air blown from the cooling fan 13a in the outdoor heat exchanger 13 and is then evaporated. The evaporated coolant passes the four-way valve 12 and is absorbed by the compressor 11 via the accumulator 16 for compression. Here, the amount of heat radiated to the air from the gas coolant in the indoor heat exchanger 16 is equal to a sum of the amount of heat corresponding to the heat absorbing amount in the indoor heat exchanger 13 and compressing work of the compressor 11.

The blowing air heated in the indoor heat exchanger 15 is further heated with the heater core 21 and the hot air can be blown by circulating the hot-water heated for temperature rise with the engine 22 into the hot water heater core 21.

Here, in some cases, dehumidified air heating is conducted to prevent fogging during the internal air absorbing mode during winter. During this dehumidified air heating operation, the heating circuit 10 is operated for cooling and the blown air is first cooled and dehumidified in the indoor heat exchanger 15 and then heated with the heater core 21. The dehumidified hot air is blown in to the vehicle compartment.

During this operation, condensed water is generated on the surface of the indoor heat exchanger 15. Therefore, when heating circuit 10 is operated for heating while condensed water is adhered to the surface of the indoor heat exchanger 15, the condensed water is re-evaporated resulting in fogging.

Figure 2:
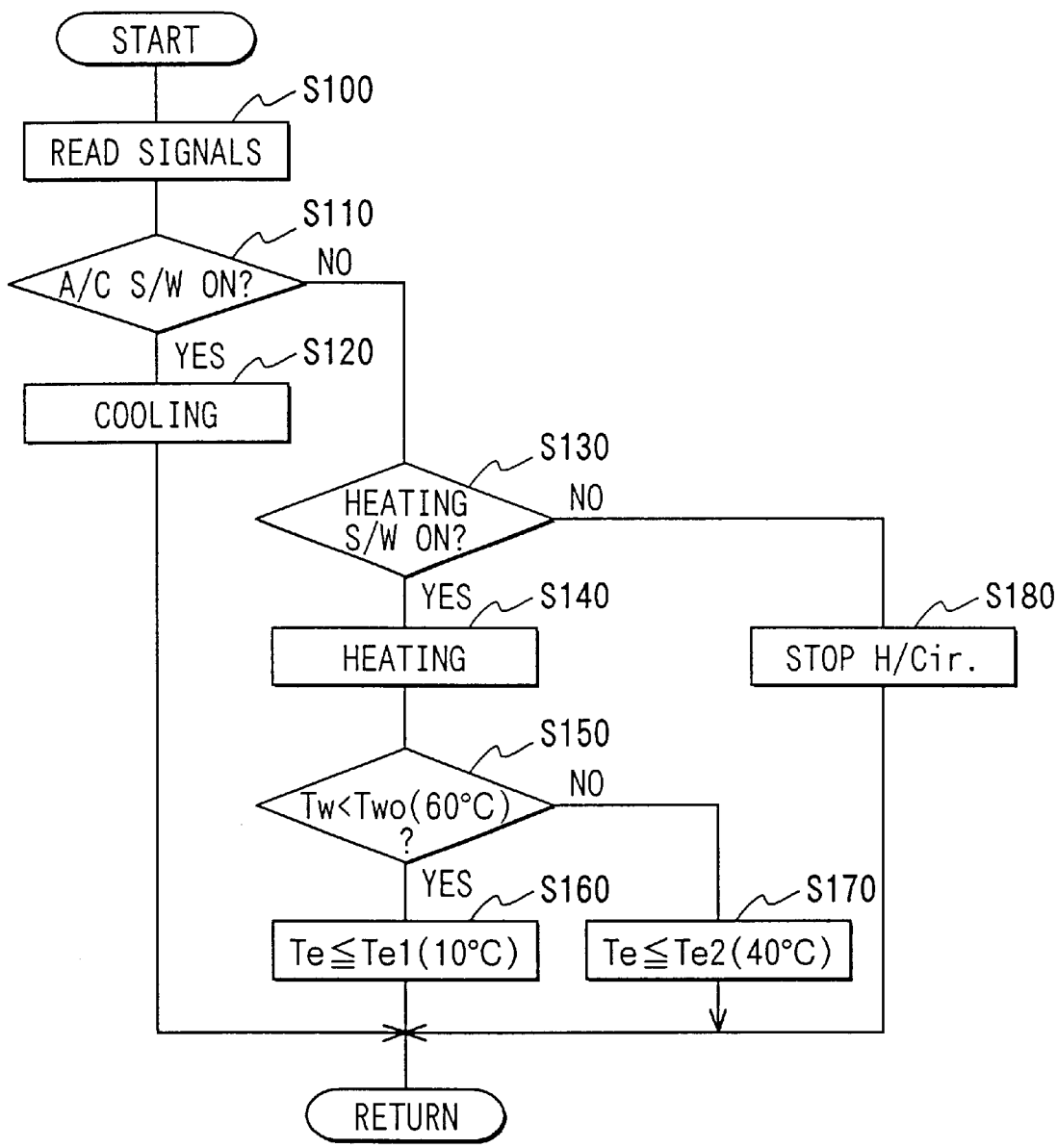
FIG. 2 is a control flowchart according to the first embodiment of the invention.

The air heating capability to prevent fogging resulting from switching to heating from cooling by the heating circuit 10 will be explained in detail. The control routine of FIG. 2 begins when an ignition switch (not illustrated) of the vehicle engine 22 is turned ON and signals from each sensor 26 to 30 and operation switch groups 32 to 37 of the air-conditioning operation panel 31 are read in step S100. Next, in step S110, whether the air cooling operation is set or not by turning ON or OFF the air-conditioning switch 32 is determined. When the air cooling operation is set (when the air-conditioning switch 32 is turned ON), the process goes to the next step S120 to drive the compressor 11 and change the four-way valve 12 to cooling, as indicated with the solid line of FIG. 1 to begin cooling.

On the other hand, when the air cooling operation is not set up, the process goes to S130 from step S110 to determine whether the air heating operation is set or not from turning ON or OFF of the air heating switch 33. When the air heating operation is set, (when the air heating switch 33 is turned ON), the process goes to S140 and drives the compressor 11 and also change the four-way valve 12 to the air heating condition indicated with a broken line of FIG. 1 to execute the air heating operation.

Next, in step S150, whether the hot-water temperature Tw detected with the water temperature sensor 26 is lower than the predetermined temperature Tw is determined. Here, when the predetermined temperature is for example 60° C. and when the hot-water temperature Tw becomes higher than 60° C., temperature of hot air blowing to the foot area and to the internal the window glass rises to a value not easily fogging the window glass. Namely, since the hot wind temperature rises, the air near the window glass does not reach the dew point.

As explained above, the hot-water temperature Tw can be a physical amount having a higher correlation with air humidity near the window. Therefore, in this embodiment, when the hot-water temperature Tw is 60° C. or higher in step S150, it is determined that the window glass is never fogged and if the hot-water temperature Tw is under 60° C., it is determined that the window glass is fogged.

When the hot water temperature Tw is under 60° C., the process goes to step S160 to control the RPM of the compressor 11 to set the air outlet temperature Te of the indoor heat exchanger 15 lower than the first predetermined temperature Te1. Here, the first predetermined temperature Te1 is the temperature to control re-evaporation of the condensed water on the surface of the indoor heat exchanger 15 even when the indoor heat exchanger 15 operates as a heat radiator. Experiment and discussion by the inventors of the present invention have proved that re-evaporation of condensed water can be controlled and fogging can be prevented even in the cold season (external air temperature is about −20° C.) by setting the first predetermined temperature Te1 to 10° C. and then setting the air outlet temperature Te to 10° C. or less.

Since there is no coolant phase change when the gas coolant radiates heat under the ultra-critical condition in the indoor heat exchanger 15, the coolant temperature is gradually lowered toward the outlet from the inlet of the indoor heat exchanger 15. Thereby, the air outlet temperature Te of the indoor heat exchanger 15 is also gradually lowered toward the outlet of coolant from the inlet. Therefore, a temperature sensor 30 is positioned at the intermediate point between the inlet and outlet of the indoor heat exchanger 15 to detect the average air outlet temperature of the indoor heat exchanger 15.

As a practical example for controlling the compressor 11 RPM in step S160, when the air outlet temperature Te rises to 10° C., the Compressor 11 RPM is lowered for the predetermined amount and thereby if the air outlet temperature Te is lowered, for example, up to 8° C., the Compressor 11 RPM is raised for the predetermined amount. As explained above, the RPM of the compressor is feedback-controlled based on the air outlet temperature Te.

On the other hand, when the hot-water temperature Tw is higher than the predetermined temperature Tw (60° C.) in step S150, since the window glass is not fogged, the Compressor 11 RPM is controlled in step S170 so that the air outlet temperature Te of the indoor heat exchanger 15 becomes the second predetermined temperature Te2 or less. Here, since the second predetermined temperature Te2 is higher (40° C.) than the first predetermined temperature Te1 (10° C.), the air heating capability of the indoor heat exchanger 15 can be increased more than when the RPM of compressor is controlled in step S160.

However, the second predetermined temperature Te2 is set considering the assured resistance pressure P0 of the indoor heat exchanger 15. The indoor heat exchanger 15 is naturally designed for use as the low pressure side heat exchanger (evaporator) during the air cooling operation and the assured resistance pressure P0 as the low pressure side heat exchanger is, for example, 10 Mpa. Therefore, when the air outlet temperature Te of the indoor heat exchanger 15 is controlled to a value or less corresponding to the assured resistance pressure P0 (10 Mpa) during the air heating operation, the indoor heat exchanger 15 designed as the low pressure side heat exchanger (evaporator) may be directly used as the high pressure side heat exchanger even if particular design change to enhance the pressure resistance of the indoor heat exchanger 15 is not executed.

In the case of $CO_2$ coolant, the average coolant temperature between the inlet and outlet of the indoor heat exchanger 15 is about 40° C. Therefore, the coolant pressure of the indoor heat exchanger 15 can be maintained under the assured resistance pressure P0 by setting the second predetermined temperature Te to 40° C. and then controlling the air outlet temperature Te of the indoor heat exchanger 15 to the second predetermined temperature Te2 or less during the air heating operation.

On the other hand, when it is determined that the air heating operation is not set in step S130, the compressor 11 is stopped in step S180 to stop the heating circuit 10.

Figure 3:
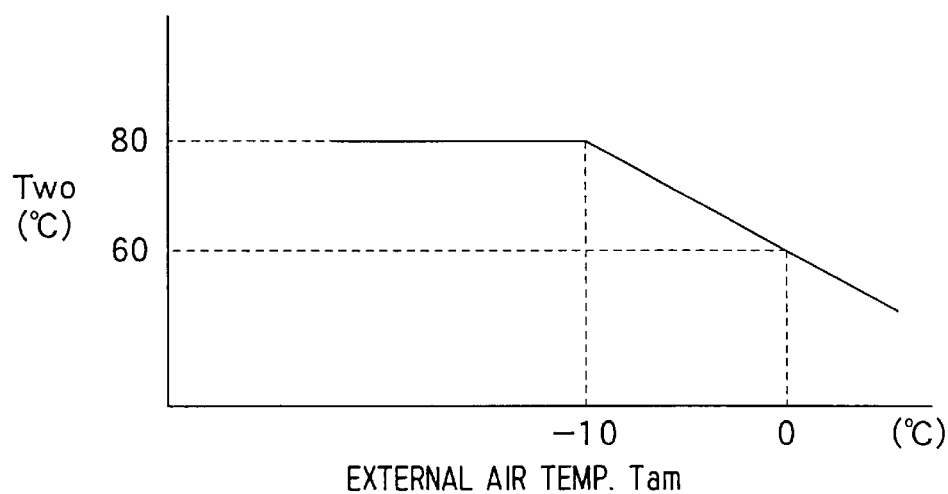
FIG. 3 is a graphical view showing the determination temperature of the hot-water temperature compensated with external air temperature according to the invention.

Meanwhile, in the first embodiment, the determination temperature Tw0 of the hot-water temperature Tw to determine whether the window glass is fogged or not is assumed to be constant at 60° C., but the window glass temperature is lowered with a drop of the external air temperature Tam and thereby the window glass may easily be fogged. Therefore, considering this point, the determination temperature Tw0 is compensated to the high temperature side with a drop of the external air temperature Tam as illustrated in FIG. 3. Thereby, the window glass can be protected more reliably from the fogging condition.

Second Embodiment

Figure 4:
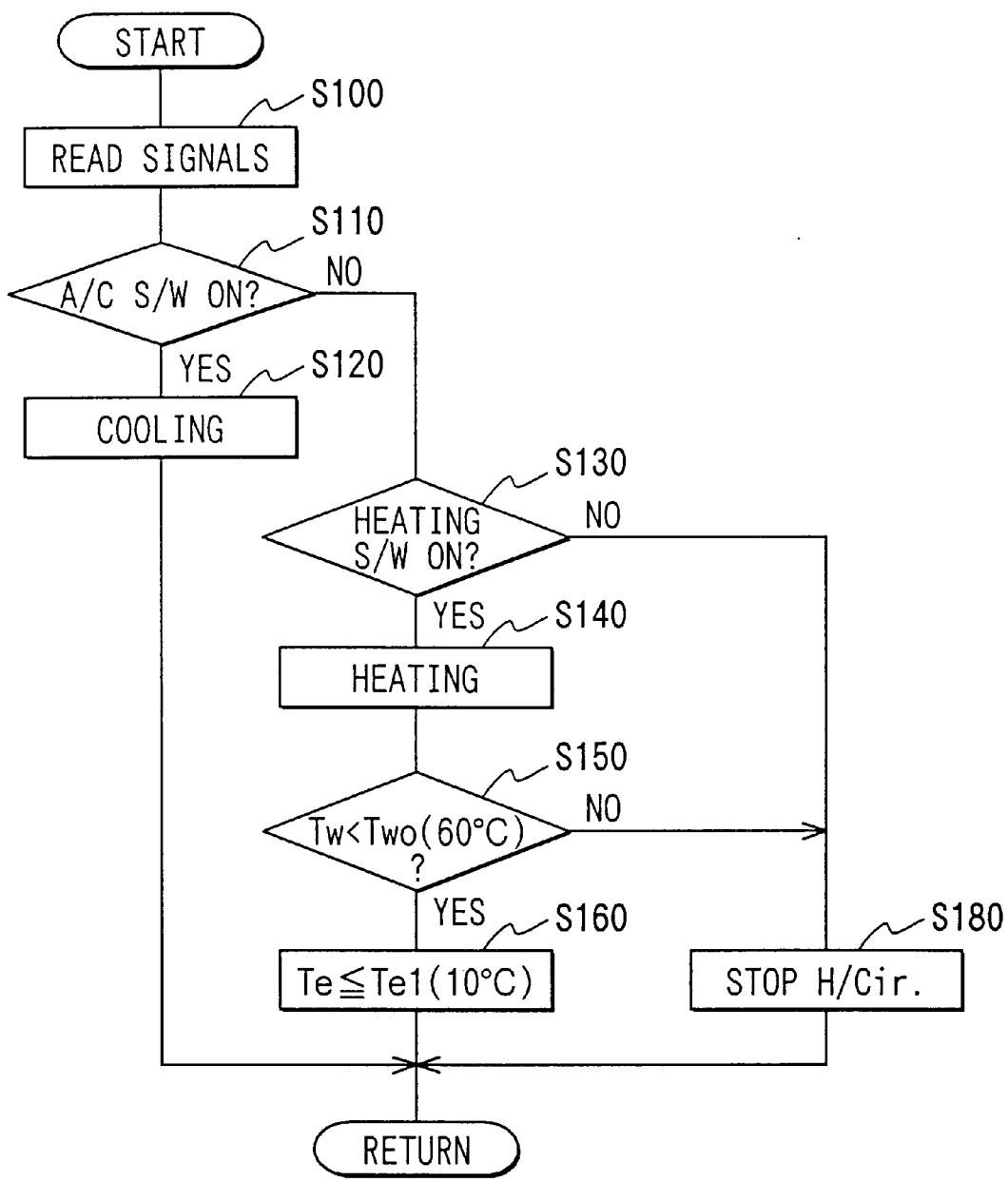
FIG. 4 is a control flowchart according to a second embodiment of the invention.

FIG. 4 illustrates the heating circuit 10 control depending on a second embodiment of the present invention. Only difference from FIG. 2 of the first embodiment thereof is that the process goes to step S180 to stop the heating circuit 10 when the hot-water temperature Tw is higher than the predetermined temperature Tw0 (60° C.) (the window glass is not fogged) in step S150.

Namely, depending on the car model, when the hot-water temperature Tw rises above 60° C., the heating condition in the vehicle can be enhanced up to a satisfactory level only when the heater core 21 uses hot-water as the hear source. Therefore, in the second embodiment, when the hot-water temperature Tw rises to 60° C. or higher, the heating circuit 10 is immediately stopped to save engine 22 power.

Third Embodiment

Figure 5:
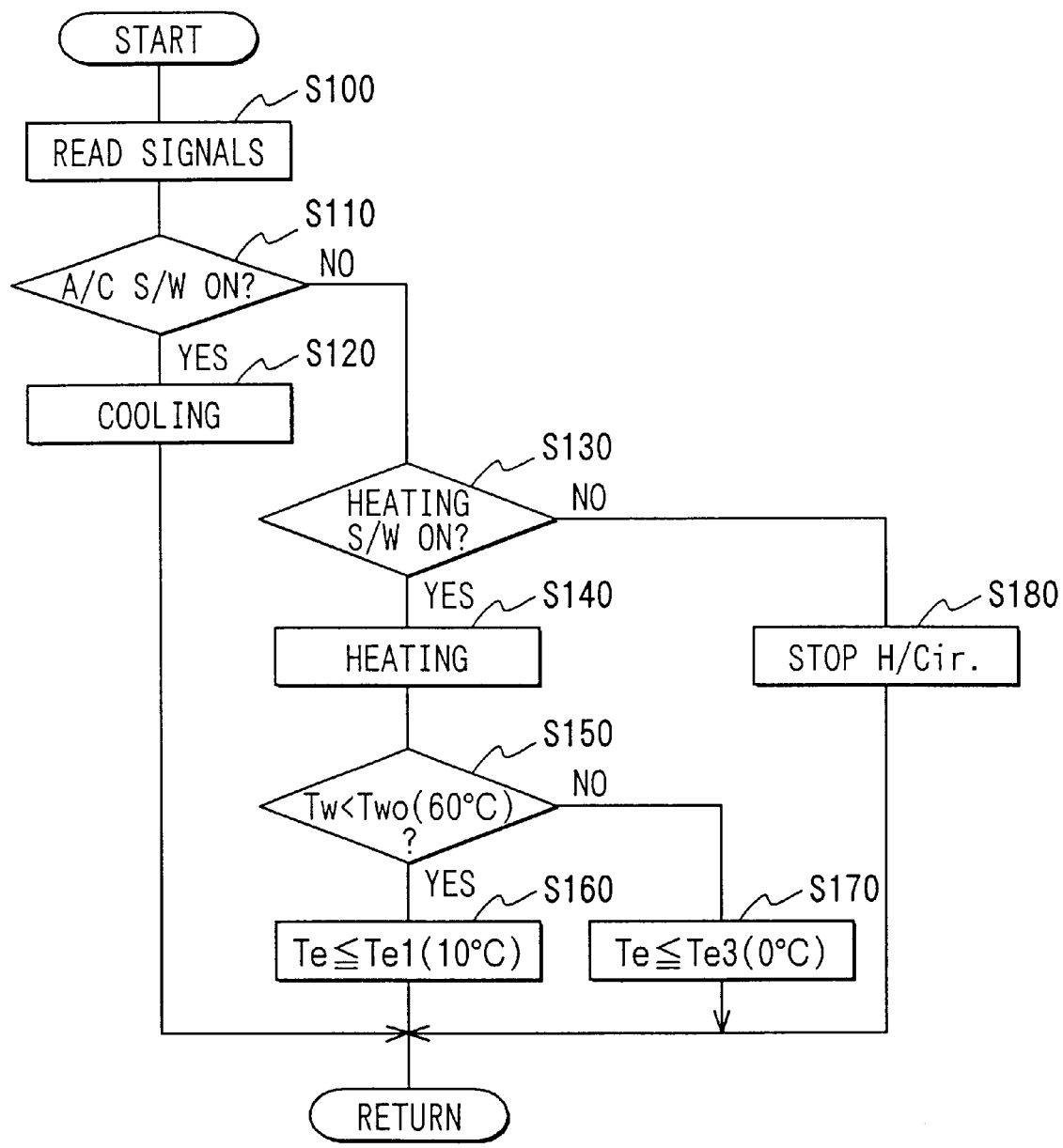
FIG. 5 is a control flowchart according to a third embodiment of the invention.

FIG. 5 illustrates the control of the heating circuit 10 according to a third embodiment. In the first embodiment, the compressor 11 RPM is controlled in step S170 to set the air outlet temperature Te of the indoor heat exchanger 15 to the second predetermined temperature Te2 (40° C.) or lower, which is higher than the first predetermined temperature Te1 (10° C.). But, in the third embodiment, the Compressor 11 RPM is controlled in step S170 to set the air outlet temperature Te of the indoor heat exchanger 15 to the third predetermined temperature Te3 (0° C.) or less, which is lower than the first predetermined temperature Te1 (10° C.).

That is, if operation of the heating circuit 10 is stopped as in the case of the second embodiment when the hot-water temperature Tw becomes 60° C. or higher, the air heating capability is insufficient. For example, when air heating is performed by introducing low temperature external air where the external air temperature ranges from −20° C. to −30° C., the air heating load becomes excessive for the air heating capability of the heater core 21, resulting in the shortage of the air heating capability.

Therefore, in the third embodiment, after the hot-water temperature Tw becomes 60° C. or higher, the Compressor 11 RPM is controlled to set the air outlet temperature Te of the indoor heat exchanger 15 to the third predetermined temperature Te3 (0° C.) or less, which is lower than the first predetermined temperature Te1 (10° C.). Thereby, the external air as low as −20° C. to −30° C. is raised up to about 0° C. with the indoor heat exchanger 15. Thereafter, external air can be heated again with the heater core 21 using hot-water as the heat source for heating within the vehicle compartment. Therefore, the air heating capability can be improved in comparison with the second embodiment.

Fourth Embodiment

Figure 6:
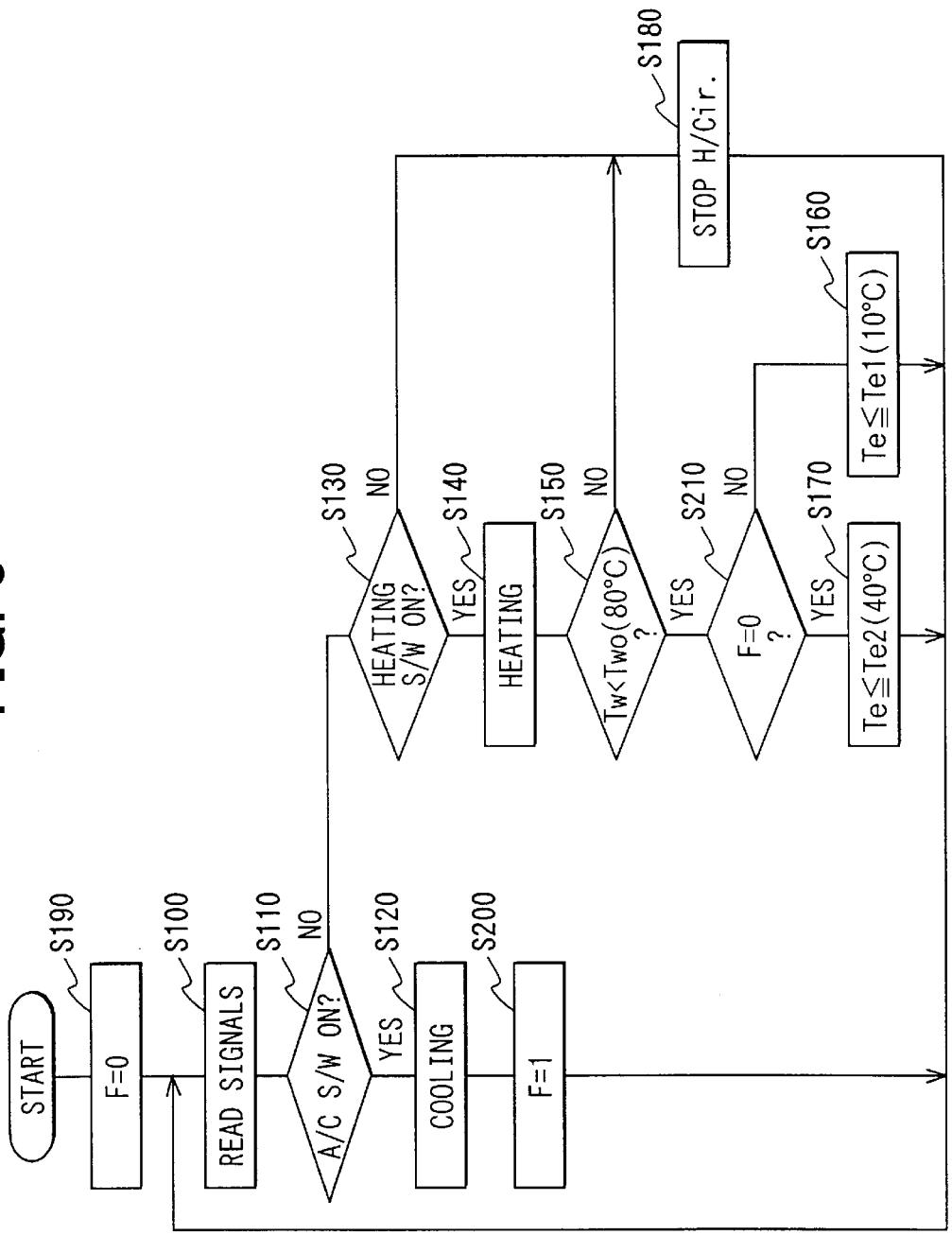
FIG. 6 is a control flowchart according to a fourth embodiment of the invention.

FIG. 6 illustrates the control of the heating circuit 10 according to a fourth embodiment of the invention. In the first to third embodiments, it is determined whether the window glass is fogged or not based on hot water temperature Tw, but in the fourth embodiment, it is determined whether the window glass is fogged or not based on the air cooling operation record of the heating circuit 10.

Differences of the control flow of FIG. 6 from FIG. 4 and FIG. 5 will be explained below. In the control flow of FIG. 6, the flag F is initialized to 0 (F=0) in step S190. When the air cooling operation is executed in step S120, the flat is then set to 1 (F=1) in step S200.

On the other hand, the determination temperature Tw0 of hot water temperature Tw is raised up to the temperature (80° C.) to such a level as sufficiently acquiring the air heating capability with the heater core 21. Therefore, in the fourth embodiment, when hot water temperature Tw becomes higher than the determination temperature Tw0, the process goes to step S180 to stop the operation of the heating circuit 10.

When hot water temperature Tw is under the determination temperature Two (80° C.), whether the flag is 0 or not is determined in step S210. This determination suggests that the air cooling operation has been conducted after the vehicle engine 22 has been started (after the ignition switch is turned ON).

Namely, when the air cooling operation is not executed even once after the vehicle engine 22 is started (ignition switch is turned ON), the initial condition of flag F=0 is maintained. Therefore, in this case, since the air cooling operation immediately before heating circuit heating 10 is not recorded, the condensed water is not reserved or reserved in small amount on the surface of the indoor heat exchanger 15. Therefore, since it can be determined that the window glass is not fogged, the process goes to step S170 to control the Compressor 11 RPM to set the air outlet temperature Te of the indoor heat exchanger 15 to the second predetermined temperature Te2 (40° C.) or less.

On the other hand, when flag F does not =0 (F≠0) in step S210, the air cooling operation is recorded before heating circuit heating 10. Thereby, the condensed water is held on the surface of the indoor heat exchanger 15 and it is determined that the window glass is fogged. Therefore, in this case, the process goes to step S160 and the Compressor 11 RPM is controlled to set the air outlet temperature Te of the indoor heat exchanger 15 to the first predetermined temperature Te1 (10° C.) or less.

Fifth Embodiment

Figure 7:
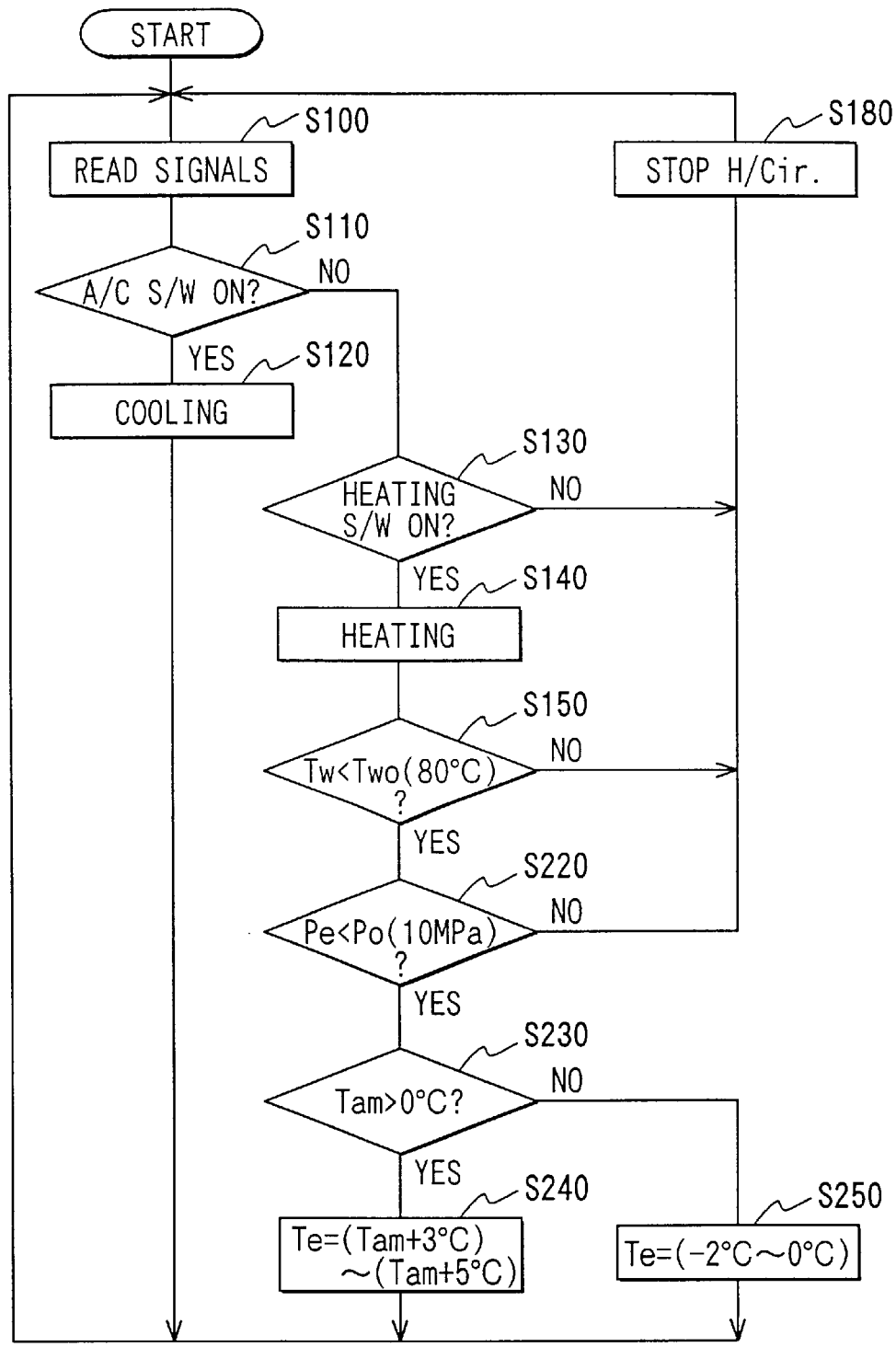
FIG. 7 is a control flowchart according to a fifth embodiment of the invention.

FIG. 7 illustrates heating circuit control according to a fifth embodiment. The processes in steps S100, S110, S120, S130 and S180 are similar to the first to fourth embodiments and the process in step S150 is identical to that of the fourth embodiment (FIG. 6).

In the fifth embodiment, a pressure sensor (not illustrated) to detect the coolant pressure Pe of the indoor heater exchanger 15 is additionally provided and the detected signal is then input to the ECU 25.

In the fifth embodiment, when hot water temperature Tw is under the determination temperature Two (80° C.) during heating, the process goes to step S220 to determine whether the coolant pressure Pe of the indoor heat exchanger 15 is under the assured resistance pressure P0 (10 Mpa) of the indoor heat exchanger 15. Here, the assured resistance pressure P0 is the assured resistance pressure explained in regard to the first embodiment.

When the coolant pressure Pe rises to P0, the process goes to step S180 to stop the heating circuit 10 to control the coolant pressure Pe not to exceed P0. Meanwhile, when the coolant pressure Pe is lower than P0, the process goes to step S230 to determine whether the external air temperature Tam is higher than 0° C. or not.

When the external air temperature Tam is higher than 0° C., the Compressor 11 RPM is controlled, in step S240, to maintain the air outlet temperature Te of the indoor heat exchanger 15 within the range of the external air temperature Tam+α (a small amount). More specifically, when the air outlet temperature Te rises to the external air temperature Tam+5° C., the Compressor 11 RPM is reduced to a predetermined RPM. Thereby, when the air outlet temperature Te is lowered to the external air temperature Tam+3° C., the Compressor 11 RPM is increased to the predetermined amount.

With the control of the Compressor 11 RPM, the air outlet temperature Te can be maintained within the range of external air temperature Tam+α (small amount). Thereby, the fogging condition of the vehicle window glass can be preferably prevented based on the following reasons.

Namely, during heating during winter, external air is generally introduced into the air-conditioning case 18 to prevent fogging. Therefore, the external air passes the indoor heat exchanger 15 but the introduced external air rises only in a small amount α(+5° C.) in the indoor heat exchanger 15 by controlling the air outlet temperature Te of the indoor heat exchanger 15 to the temperature (Tam+α) or less. Therefore, relative humidity of introduced external air is small. Accordingly, re-evaporation of condensed water can be controlled with the indoor heat exchanger 15.

Since the vehicle window glass is in direct contact with the external air, temperature of the window glass surface is a little higher than the external temperature Tam. Therefore, when the air outlet temperature Te of the indoor heat exchanger 15 is controlled to a temperature a little higher (Tam+α) than the external air temperature Tam, if the air blown toward the vehicle window glass from the defroster outlet (not illustrated) provided downstream of heater core 21 does not reach the saturated condition when it contacts the window glass and is then cooled to a temperature identical to the vehicle window glass, dew is not generated on the window glass of the vehicle.

Moreover, when external air is introduced into the air-conditioning case 18 to heat, the air outlet temperature Te of the indoor heat exchanger 15 is controlled to external air temperature +5° C. with rise of the external temperature higher than 0° C. Thereby, the air heating load of the heater core 21 can be reduced as much as the temperature rise of +5° C. and the air heating effect in the vehicle compartment can be improved.

On the other hand, when the external air temperature Tam is 0° C. or less, the process goes to step S250 from step S230 to control the Compressor 11 RPM to maintain the air outlet temperature Te of the indoor heat exchanger 15 to the predetermined range near 0° C. In more practical, when the air outlet temperature Te rises up to 0° C., the Compressor 11 RPM is reduced in the predetermined amount and thereby when the air outlet temperature Te is lowered up to −2° C., the Compressor 11 RPM is increased for the predetermined amount.

With the control of Compressor 11 RPM as explained above, the air outlet temperature Te of the indoor heat exchanger 15 can be maintained in the predetermined range (−2° C. to 0° C.) near 0° C.

Therefore, since it can be prevented that the condensed water frozen in the indoor heat exchanger 15 is dissolved and is then evaporated, generation of the fogging of vehicle window glass due to evaporation of the condensed water can be prevented. Moreover, since the air heating mode is used when the external air temperature is as extremely low as −30° C. to −20° C. in the cold district, in this case, the external air introduced into the air-conditioning case 18 is raised up to the temperature near 0° C. with the heat radiation of the gas coolant in the indoor heat exchanger 15 from −30° C. to −20° C. with heating circuit heating 10 and therefore the air heating effect of vehicle can be improved as much as such temperature rise.

Sixth Embodiment

In each embodiment explained above, when fogging is determined during heating circuit heating 10, the air heating capability of the indoor heat exchanger 15 is limited to set the temperature of the indoor heat exchanger 15 to the first predetermined temperature Te1 or lower to prevent fogging.

However, in the heating circuit 10, since the total amount of heat corresponding to the amount of heat absorbed and the amount of compression work in the indoor heat exchanger 13 is radiated during the air heating operation with the indoor heat exchanger 15, the efficiency becomes high (COP) and the compressor power is comparatively small. Therefore, the driving vehicle engine 22 load becomes small.

As a result, since the hot-water temperature of engine 22 rises slowly, fogging is determined when the hot water temperature reaches the predetermined temperature Two (for example, 60° C.) or lower as in each embodiment explained above. When the air heating capability of the indoor heat exchanger 15 is limited by the control (control for preventing fogging), the control period becomes longer and, as a result, the air heating capability of the heating circuit 10 is not fully realized in the vehicle compartment.

Therefore, in the sixth embodiment, the heating circuit 10 and the air heating system (hot gas heater cycle) provides larger compressor power than the heating circuit 10, are set selectable and the hot gas heater cycle is operated when hot water temperature is low. Thereby the power of engine 22 is increased. As a result, temperature rise of hot water is accelerated to quickly improve air heating performance.

Figure 8:
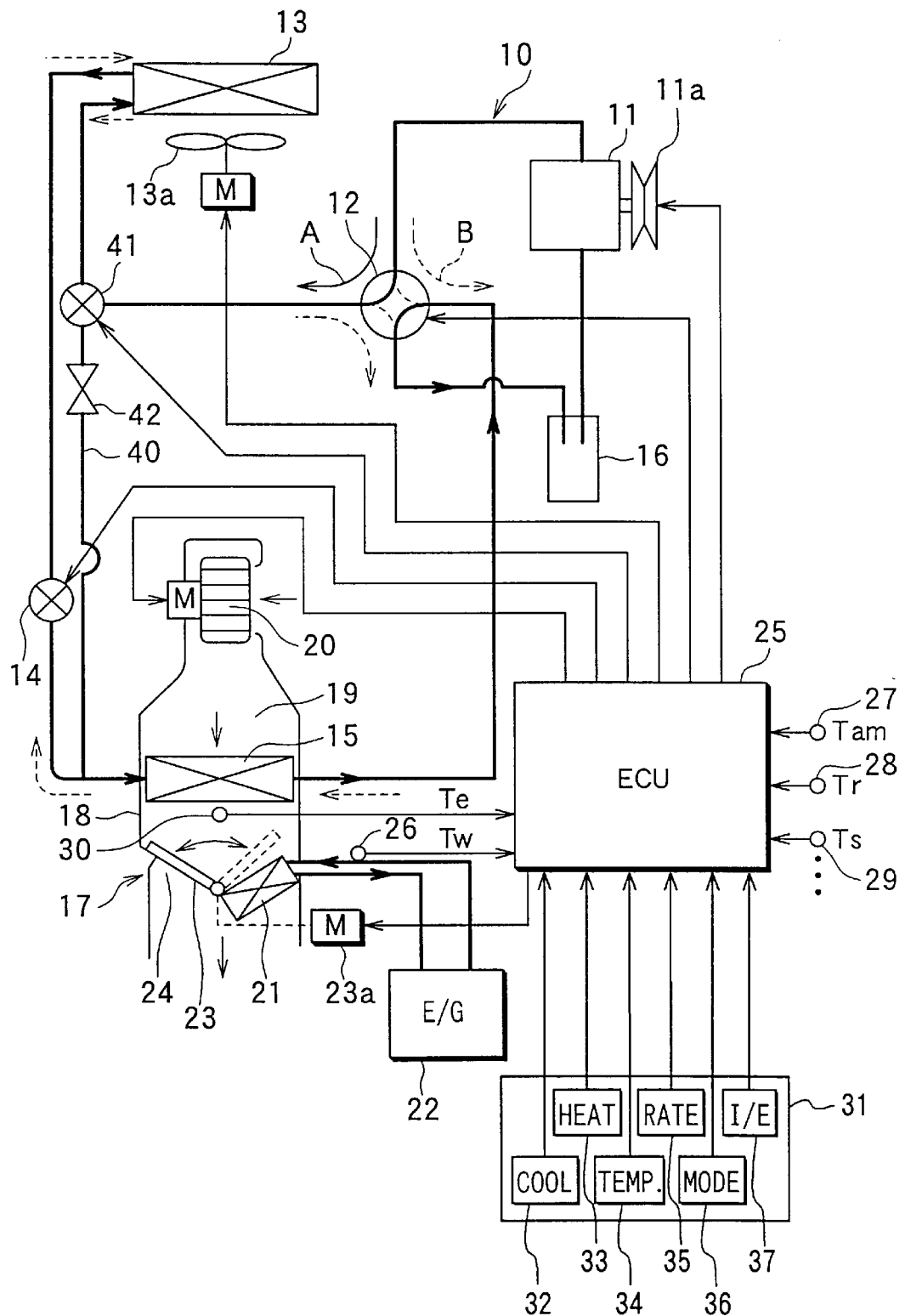
FIG. 8 is a schematic view of a sixth embodiment of the invention.

FIG. 8 illustrates the sixth embodiment and the compressor 11 is driven with the vehicle engine 22 via an electro-magnetic clutch 11a.

In the sixth embodiment, in the coolant path during cooling indicated with a solid arrow, hot gas bypass 40 is provided to directly communicate the coolant path between the four-way valve 12 and indoor heat exchanger 13 inlet with the indoor heat exchanger 15 inlet. This hot gas bypass 40 directly introduces the exiting gas coolant from the compressor 11 to the indoor heat exchanger 15 to set the hot gas heater cycle for heating with high temperature exhaust gas coolant.

At the branching part of the path in the side of the indoor heat exchanger 13 and the hot gas bypass 40, an electric change-over valve 41 that is controlled to open or close with the ECU 25 is also provided. With this electric change-over valve 41, coolant flow to the hot gas bypass 40 and the coolant flow to the indoor heat exchanger 13 are changed.

This electric change-over valve 41 can be formed by a combination of electro-magnetic valves, wherein one is located in the path in the side of the indoor heat exchanger 13 and the other is located in the path in the side of the hot gas bypass 40. Moreover, an electric change-over valve 41 can also be formed through combination of the electro-magnetic valve in the path in the side of the indoor heat exchanger 13 and the differential valve in the path in the side of the hot gas bypass 40. In addition, the electric change-over valve 41 can be formed with a three-way change-over valve.

The hot gas bypass 40 is provided with a decompressing apparatus 42 to directly introduce the exhaust gas coolant of the compressor 11 to the indoor heat exchanger 15 after a predetermined amount of decompression in the decompressing apparatus 42. The decompressing apparatus 42 can be formed of a fixed throttle and thereby can be integrated to the path of the electric change-over valve 41.

Even in the sixth embodiment, $CO_2$ is used as the coolant for the heating circuit 10. Thereby, the high pressure (high pressure coolant temperature) during heating can be increased based on the characteristics of the $CO_2$ coolant to assure the air heating capability of the heating circuit 15.

For heating circuit heating 10, the total heat absorption in indoor heat exchanger 13 and the amount of heat corresponding to the compression work is radiated from the indoor heat exchanger 15 but in the hot gas heater cycle, since the exhaust gas coolant of the compressor 11 is directly introduced to the indoor heat exchanger 15 through the hot gas bypass 40, only the heat corresponding to the compression work of the compressor 11 is radiated with the indoor heat exchanger 15. Therefore, in the hot gas heater cycle, the efficiency (air heating performance/compressor power) is lowered in comparison with heating circuit heating 10.

Figure 9:
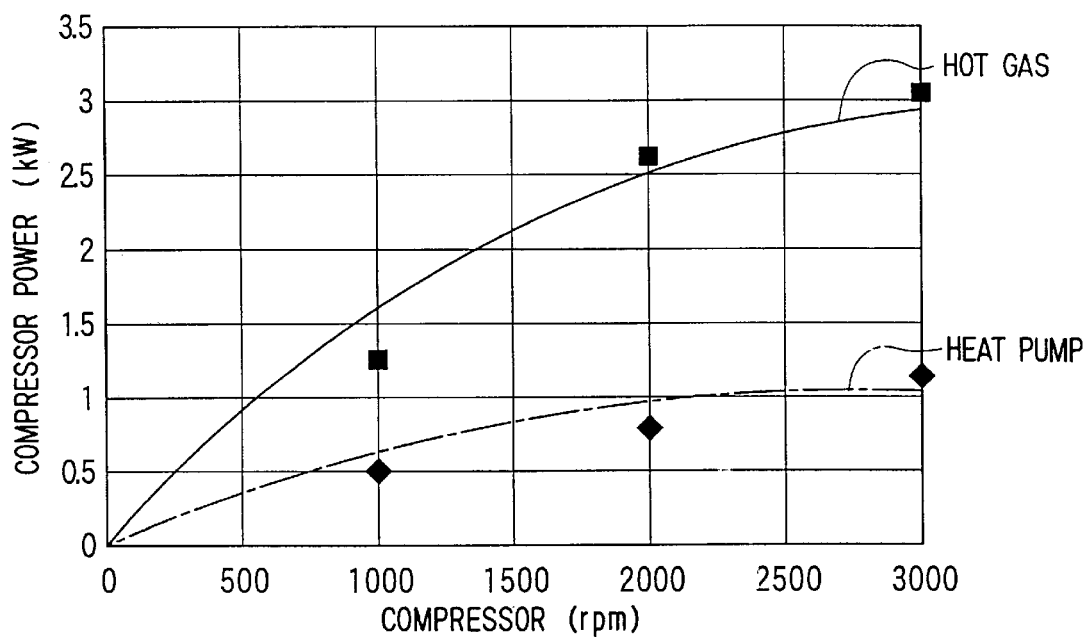
FIG. 9 is a graphical view of the hot gas heater cycle used in the sixth embodiment and the compressor power by the heating circuit according to the invention.

Accordingly, higher exhaust pressure of compressor 11 than that of heating circuit heating 10 is required to obtain heating performance. As a result, as illustrated in FIG. 9, compressor power is increased to two to three times the power of the heating circuit 10 in the hot gas heater cycle when equal heat radiation in the indoor heat exchanger is attained.

In the sixth embodiment, the power of compressor 11 is forcibly increased to accelerate temperature rise of hot water temperature of engine by selecting the hot gas heater cycle when hot water temperature of engine is low based on the characteristic that the compressor power increases in the hot gas heater cycle.

Figure 10:
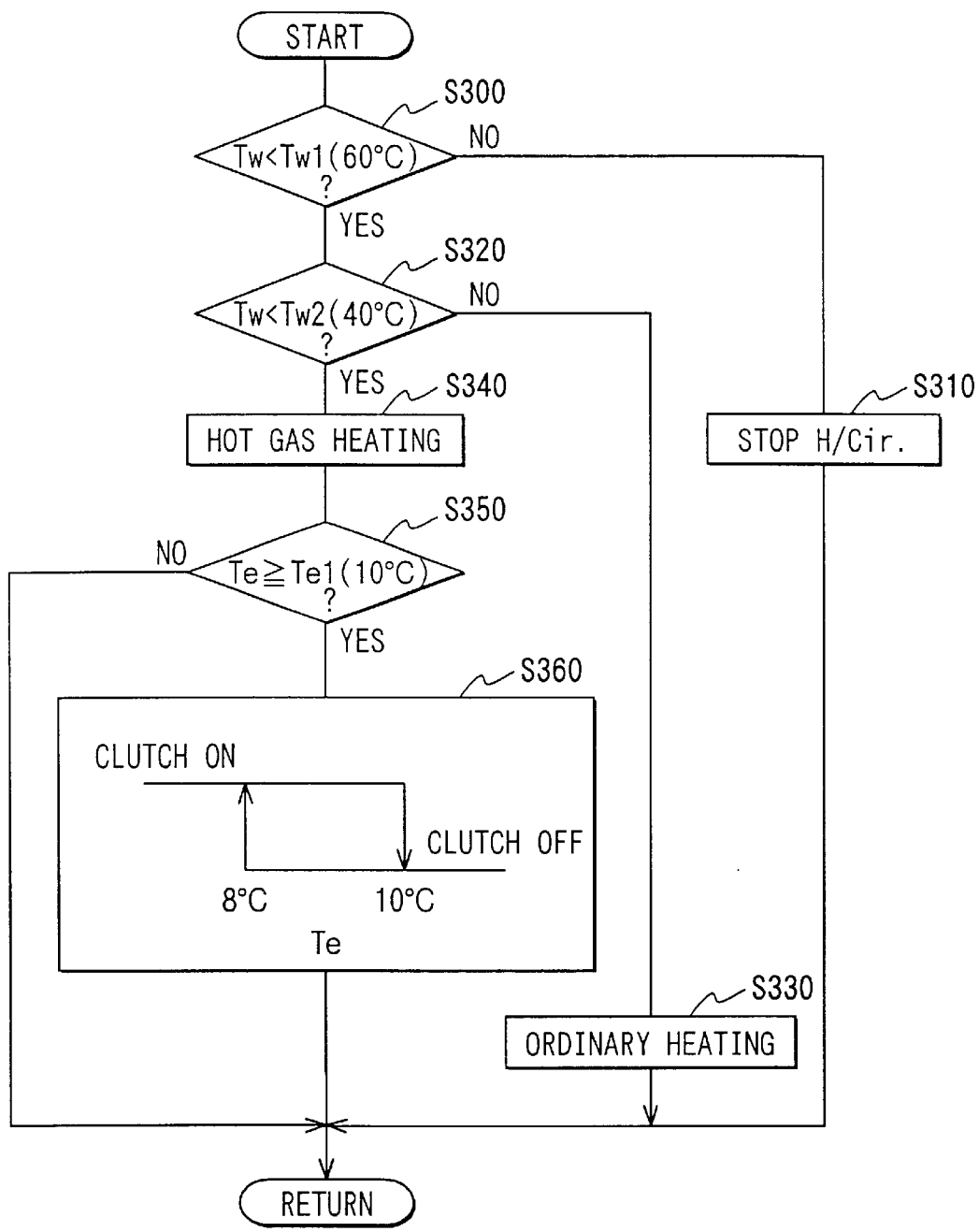
FIG. 10 is a control flowchart of the sixth embodiment of the invention.

FIG. 10 illustrates a flowchart indicating operation in the sixth embodiment. The control routine of FIG. 10 starts when the air heating mode is set by turning ON the air heating switch 33. First, in step S300, it is determined whether hot water temperature Tw detected with a water-temperature sensor 26 is higher than the first predetermined temperature Tw1 or not. Here, the first predetermined temperature Tw1 is for example 60° C. and when hot water temperature Tw becomes 60° C. or higher, the air heating condition in the vehicle compartment can almost be satisfied in some cases only with the air heating capability of the heater core 21 using hot water as the heat source.

Therefore, the process goes to step S310 when hot water temperature Tw is higher than the first predetermined temperature Tw1 (=60° C.). In this step, the electro-magnetic clutch 11a is turned OFF to stop the compressor 11 to stop heating circuit 10. Thereby, air heating in the vehicle compartment is obtained only with heater core 21 using hot water as the heat source.

On the other hand, when hot water temperature Tw is lower than the first predetermined temperature Tw1, the process goes to step S320 to determined whether hot water temperature Tw is lower than the second predetermined temperature Tw2. Here, the second predetermined temperature Tw2 is lower than the first predetermined temperature Tw1 and is for example 40° C.

When hot water temperature Tw is higher than the second predetermined temperature Tw2, the process goes to step S330 to start the ordinary air heating operation with the heating circuit. Namely, in FIG. 8, a four-way valve 12 is operated when the air heating mode indicated with a broken line and the electro-magnetic clutch 11a is turned ON to drive the compressor 11 with the vehicle engine 22. Simultaneously, the electric change-over valve 41 is changed over to close the path in the side of the hot gas bypass 40 and open the path in the side of the outdoor heat exchanger 13.

Thereby, with operation of the compressor 11, the coolant circulates the heating circuit 10 in the path indicated with the arrow mark B of a broken line. Thereby, the exhaust coolant gas of the compressor 11 directly enters the indoor heat exchanger 15 to heat the air (usually, external air). When heating circuit heating 10 (Tw<Tw1) is required, air-mixing door 23 is fully opens (maximum air heating position) the path of the heater core 21. Therefore, air heated with the indoor heat exchanger 15 is further heated with the heater core 21 and is then blown into the vehicle compartment.

Meanwhile, when hot water temperature Tw is lower than the second predetermined temperature Tw2, the process goes to step S340 from step S320 to operate the heating circuit 10 in the hot gas heater cycle.

Namely, in FIG. 8, the four-way valve 12 operates in the cooling mode indicated with a solid line, and the electromagnetic clutch 11a is turned ON to drive the compressor 11 with the vehicle engine 22. Simultaneously, the electric change-over valve 41 is switched to open the path in the side of the hot gas bypass 40 and to close the path in the side of the outdoor heat exchanger 13. Thereby, the exhaust coolant gas of the compressor 11 flows toward the electric change-over valve 41 as indicated with the arrow mark A of a solid line and the high temperature coolant gas flows into the hot gas bypass 40 passing electric change-over valve 41. This high temperature coolant gas is decompressed for the specified amount in the decompressing apparatus (fixed throttle) of the hot gas bypass 40 and is then directly introduced to the indoor heat exchanger 15.

Indoor heat exchanger 15 heats air (usually, external air) blown by blower 20 through the heat exchanger with high temperature coolant gas. The air heated in the indoor heat exchanger 15 is further heated with the heater core 21 and is then blown into the vehicle compartment. Thereafter, coolant gas having radiated heat in the indoor heat exchanger 15 is drawn into compressor 11, passing the four-way valve 12 and accumulator 16, and is then compressed again. As in step S340, the hot gas heater operation is set. Then, whether the air outlet temperature Te of the indoor heat exchanger 15 is higher than the predetermined temperature Te is determined in step S350. Here, like each embodiment, the predetermined temperature Te1 is determined to control re-evaporation of condensed water on the surface of indoor heat exchanger 15 even when the indoor heat exchanger 15 operates as a heat radiator. In general, the predetermined temperature Te1 is preferably determined as 10° C. (Te1=10° C.).

When the air outlet temperature Te is the predetermined temperature Te1 (10° C.) or higher, the process goes to step S360 to execute the capability control operation of the hot gas heater. As a practical example, the capability control (capability limitation) of the hot gas heater is conducted by executing the ON/OFF control of the operation of compressor 11, wherein the electro-magnetic clutch 11a (compressor 11) is turned OFF under the condition of Te≧10° C. and this clutch 11a is turned ON under the condition of Te≦8° C. Thereby, when the indoor heat exchanger 15 operates as the heat radiator, re-evaporation of condensed water is controlled and fogging can be prevented even during cold seasons.

When the air outlet temperature Te is the predetermined temperature Te1 (10° C.) or lower, the capability control of the hot gas heater operation is not performed. During the hot gas heater operation, since compressor power is increased up to two to three times in compared to the heating circuit, as illustrated in FIG. 9, temperature rise of hot water can be accelerated through increase of the driving vehicle load engine 22 by setting the hot gas heater operation (increasing the compressor power) when hot water temperature Tw is lower than the second predetermined temperature Tw2 (40° C.). As a result, hot water air heating performance with the heater core 21 can be improved.

Seventh Embodiment

In the above sixth embodiment, the hot gas heater operation is selected until hot water temperature Tw rises up to the second predetermined temperature Tw2 and thereby the power of compressor 11 is forcibly increased. However, in the seventh embodiment, an opening angle of the electric expansion valve 14 is maintained at the full-opening condition or the predetermined opening angle or more near the full-opening condition during heating circuit heating 10 by paying attention to the electric expansion valve 14 that reduces the pressure of the high pressure coolant having passed the indoor heat exchanger 15. More specifically, in the control routine of FIG. 10, in step S340, it is enough to perform the heating circuit operation instead of the hot gas heater operation, by keeping the opening angle of the electric expansion valve 14 to the full-opening condition or the predetermined opening angle near the full-opening condition.

Thereby, when hot water temperature is low, the power of compressor 11 can increased by increasing coolant circulation of heating circuit 10 and therefore the engine 22 load increases to raise hot water temperature.

Eighth Embodiment

Figure 11:
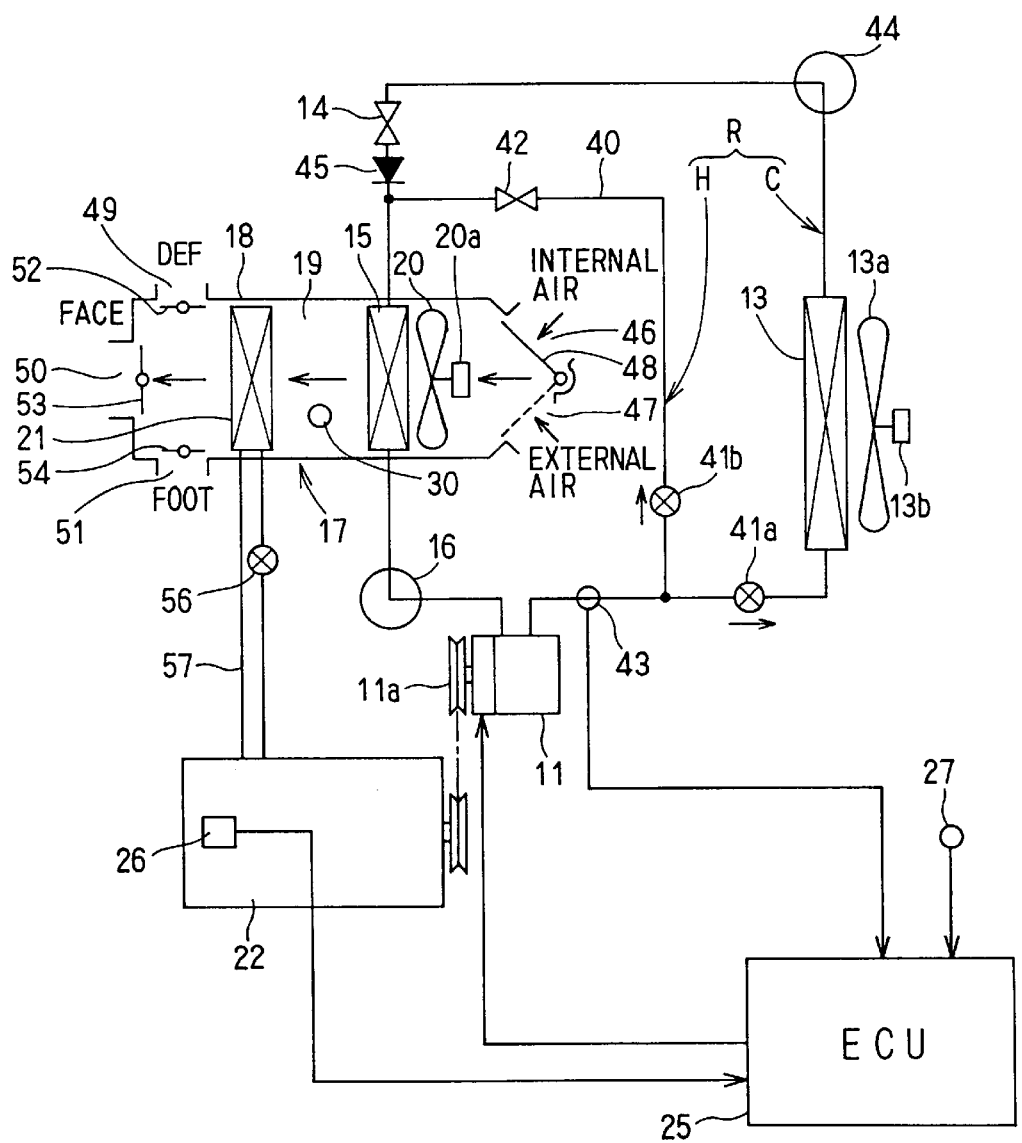
FIG. 11 is a schematic view of an eighth embodiment of the present invention.

FIG. 11 shows an entire structure of an automotive air-conditioner in the eighth embodiment.

In air-conditioning refrigerant cycle R, a cooling refrigerant cycle C and a hot gas heater cycle H can be switched. The compressor 11 is driven by the engine through a cooling electromagnetic clutch 11a. A pressure sensor 43 is provided in a discharge side refrigerant passage of the compressor 11 for detecting the discharge pressure of the compressor 11.

The discharge side of the compressor 11 is connected to the outdoor hear exchanger 13 through the cooling electromagnetic valve 41a. The outlet side of the outdoor heat exchanger 13 is connected to a receiver 44 storing liquid phase refrigerant. The outdoor heat exchanger 13 is disposed in a vehicle engine compartment with the vehicle engine etc. The refrigerant is heat exchanged with outside air blown by the cooling fan 13a.

The outlet side of the receiver 44 is connected to a first decompressing apparatus 14. The first decompressing apparatus 14 is a thermal type expansion valve. The outlet side of the first decompressing apparatus 14 is connected to an indoor heat exchanger 15 through a check valve 45. The outlet side of the indoor heat exchanger 15 is connected to the suction side of the compressor 11 through an accumulator 16.

In the general cooling refrigerant cycle C, the refrigerant flows from the discharge side of the compressor 11, through the cooling electromagnetic valve 41a, outdoor heat exchanger 13, receiver 44, first decompressing apparatus 14, check valve 45, indoor heat exchanger 15, accumulator 16, and returns to the compressor 11.

A hot gas bypass 40 for bypassing the outdoor heat exchanger 13 etc. is provided between the discharge side of the compressor 11 and the inlet side of the indoor heat exchanger 15. In the bypass 40, a heating electromagnetic valve 41b a second decompressing apparatus 42 are provided in series with each other. The second decompressing apparatus 41b can be formed of an orifice, capillary tube, or the like. In the hot gas heater cycle H, the refrigerant flows from the discharge side of the compressor 11, through the heating electromagnetic valve 41b, second decompressing apparatus 42, indoor heat exchanger 15, accumulator 16m and returns to the suction side of the compressor 11.

An indoor unit 17 includes an air-conditioning case 18 forming an air path 19. Conditioned air flows through the air path 19 toward a vehicle cabin. In the air-conditioning case 18, an internal/external air change-over door 48 is provided at the upstream side of an electric blower 20. The internal/external air change-over door 48 switches an internal air from an internal air inlet 46 and an external air from an external air inlet 47. Here, the internal/external air change-over door 48 is operated by a motor 48a (see FIG. 12) through a link mechanism (not illustrated).

At the most downstream side of the air-conditioning case 18, a defroster (DEF) outlet 49, a face (FACE) outlet 50, a foot (FOOT) outlet 51, and mode switching doors 52–54 for selectively opening and closing these outlets. The conditioned air flows toward an inner surface of a vehicle windshield grass through the defroster outlet 49. The conditioned air flows toward a head and breast of a passenger through the face outlet 50. The conditioned air flows toward a foot area of the passenger through the foot outlet 51.

The mode doors 52–54 are operated by a motor 55 (see FIG. 12) through link mechanisms (not illustrated). The mode doors 52–54 switch face (FACE) mode, bi-level (B/L) mode, foot (FOOT) mode, foot-def (F/D) mode, and defroster (DEF) mode. In the face mode, only face outlet 50 is opened. In the bi-level mode, both face outlet 50 and foot outlet 51 are opened. In the foot mode, the foot outlet 51 is opened. In the foot-def mode, both foot outlet 51 and defroster outlet 49 are opened. In the defroster mode, the defroster outlet 49 is opened.

The electric blower 20 includes a centrifugal type blower fan, and the centrifugal blower fan is driven by a blower motor 20a. Here, the blower amount of the centrifugal type blower fan 20 is switched from zero stage (OFF) to 32nd stage continuously or in step by adjusting blower control voltage impressed on the blower motor 20a.

A heater core 21 and a warm water valve 56 is provided in a warm water circuit 57. The heater core heats the air having passed through the indoor heat exchanger 15. A water pump driven by the engine 22 circulates warm water in the warm water circuit 57. A warm water type heater includes the engine 22, the heater core 21, the warm water circuit 57, and the warm water valve 56.

The warm water valve 56 is always is opened except during a maximum cooling operation. The opening degree of the warm water valve 56 is controlled to adjust a flow amount of the water flowing into the heater core 21, so that a temperature of air blown toward the vehicle cabin is adjusted. In the eighth embodiment, the warm water valve 56 is used as a temperature adjusting means for adjusting a temperature of air blown into the vehicle cabin. Alternatively, as in the first embodiment, the air-mixing door 23 may be used as the temperature adjusting means. The warm water valve 56 is operated by a motor 56a (see FIG. 12).

Figure 12:
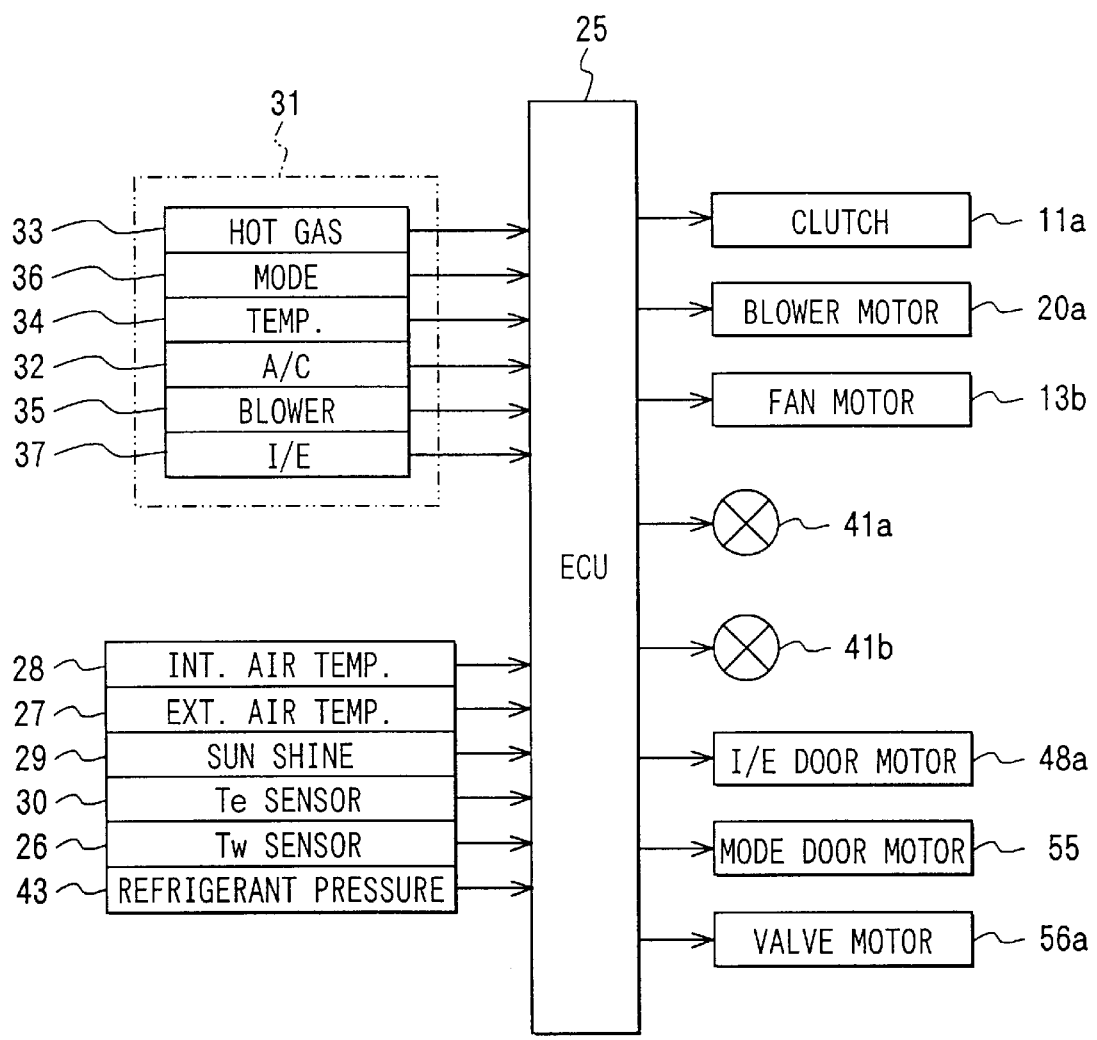
FIG. 12 is an electric control block diagram of the eighth embodiment.

FIG. 12 is an electronic control block diagram in the eighth embodiment. An air-conditioning ECU 25 includes a micro computer and miscellaneous circuits. Switch operation signals from miscellaneous operation switches 32–37 on an air-conditioning operation panel 31 and sensor signals from sensors 26–30, 43 are input into the ECU 25. The ECU 25 carries out a predetermined calculation based on these input signals and controls elements 11a, 13b, 20a, 41a, 41b, 48a, 55, 56 of the air conditioner.

The air conditioning switch 32 on the air conditioning operation panel 31 defines start or stop of the compressor 11. Further, the air conditioning switch 32 sets the cooling mode of the refrigerant cycle. The hot gas switch 33 sets a heating mode of the hot gas heater cycle H.

An operation of the above-described eighth embodiment will be described. During the cooling mode, the ECU 25 opens the cooling electromagnetic valve 41a, and closes the heating electromagnetic valve 41b. Thus, when the electromagnetic clutch 11a is energized and the compressor 11 is driven by the engine 22, gas refrigerant discharged from the compressor 11 passes through the cooling electromagnetic valve 41a and flows into the outdoor heat exchanger 13.

In the outdoor heat exchanger 13, the refrigerant is cooled by external air blown by the cooling fan 13a and is condensed. The refrigerant having passed through the outdoor heat exchanger 13 is divided into gas phase refrigerant and liquid phase refrigerant in the receiver 44. Only liquid phase refrigerant is decompressed at the first decompressing apparatus 14, and becomes low-temperature and low-pressure gas-liquid phase refrigerant.

The low pressure refrigerant passes through the check valve 45 and flows into the indoor heat exchanger 15. In the indoor heat exchanger 15, the refrigerant absorbs heat of the air conditioning air blown by the electric blower 20, and evaporates. The conditioned air cooled at the indoor heat exchanger 15 flows into the vehicle cabin and cools the inside of the cabin. The gas phase refrigerant which has evaporated in the indoor heat exchanger 15 is suctioned to the compressor 11 through the accumulator 16, and is compressed.

During the heating mode in winter, the ECU 25 closes the cooling electromagnetic valve 41a, and opens the heating electromagnetic valve 41b for using the hot gas bypass 40. Thus, high temperature gas refrigerant discharged from the compressor 11 passes through the heating electromagnetic valve 41b, is decompressed at the second decompressing apparatus 42, and flows into the indoor heat exchanger 15.

Here, the check valve 45 prevents the gas refrigerant from the hot gas bypass 40 from flowing toward the first decompressing apparatus 14. Thus, in the refrigerant cycle (hot gas heater cycle), the refrigerant flows from the discharge side, through the heating electromagnetic valve 41b, second decompressing apparatus 42, indoor heat exchanger 15, accumulator 16, and returns to the suction side of the compressor 11.

The super heated gas refrigerant decompressed at the second decompressing apparatus 42 heats the conditioning air at the indoor heat exchanger 15. Here, heat amount radiated from the gas refrigerant at the indoor heat exchanger 15 corresponds to a compression energy of the compressor 11. Here, the conditioning air can be further heated at the heater core 21 by allowing the warm water to flow into the heater core 21 through the warm water valve 56, so that the heated air flows into the vehicle cabin. The gas refrigerant having radiated heat thereof in the indoor heat exchanger 15 is sucked into the compressor 11 through the accumulator 16, and is compressed.

Neat, an example of refrigerant cycle control in the eighth embodiment will be explained. The refrigerant cycle control includes a heating performance restricting control for preventing a windshield frost due to the switching of cooling mode and heating mode when the external air is low in winter.

Figure 13:
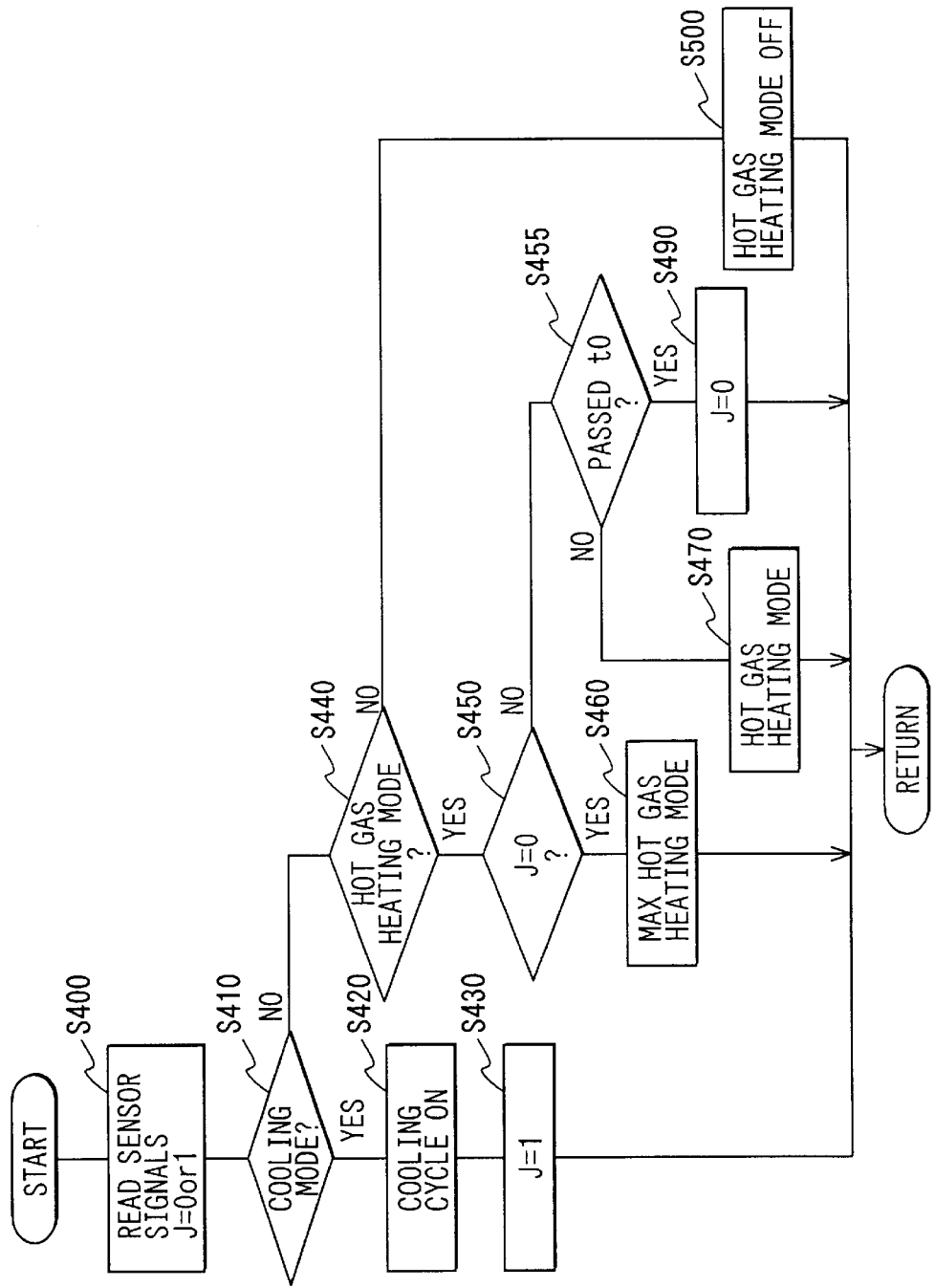
FIG. 13 is a control flowchart of the eighth embodiment.

The control routine in FIG. 13 starts by igniting the vehicle engine 22, for example. At step S400, signals from the sensors 26–30, 40 and operation switches 32–37 are read. Further, a cooling flag J at the last operation of the vehicle engine 22.

Here, the cooling flag J is 1 when the air conditioning operation is stopped while the refrigerant cycle R carries out the cooling operation. On the other hand, the flag J is 0 when the air conditioning operation is stopped while the refrigerant cycle R does not carry out the cooling operation.

Even when the refrigerant cycle R carried out the cooling operation at the last air conditioning operation, if the hot gas heater cycle carried out a heating operation more than a predetermined period t0 after that and it is determined that drain water in the indoor hat exchanger evaporate, step S490 sets the flag J to 0. The signal of the cooling operation flag J is memorized in the ECU 25 even after the vehicle engine 22 is stopped, and is read at step S400 during next air conditioning operation.

Next, at step S410, the ECU 25 determines whether the cooling mode is set or not. For example, that the cooling mode is set or not is determined by determining whether the air conditioning switch is on or not. When the switch 32 is made on, the step S410 determines "YES" and step S420 allows the refrigerant cycle R to operate the general cooling refrigerant cycle C. That is, the electromagnetic clutch 11 is energized to operate the compressor 11, the cooling electromagnetic valve 41a is opened, and the heating electromagnetic valve 41b is closed, so that the refrigerant cycle R is operated under the above-described cooling mode. Thereby, the indoor heat exchanger 15 works as an evaporator, and the blown air is cooled. At next step S430, the flag is set to 1 by setting the cooling mode.

When the cooling mode is not set, the step S410 determines "NO", and proceeds to step S440 for determining whether the heating mode by the hot gas heater cycle H is set or not. This determination is, for example, executed by determining the hot gas switch 33 is on or not. When the switch 33 is made on, step S440 determines "YES", and next step S450 determines whether the cooling flag J is 0 or not.

Since that the flag J is 0 indicates the cooling operation was not carried out at the last air conditioning operation, or heating operation of the hot gas heater cycle H removed the drain water from the indoor heat exchanger 15 even when the cooling operation was carried out, the drain water does not evaporate again in the indoor heat exchanger 15 even when the hot gas heater cycle H carries out the heating operation. Thus, the windshield is not clouded.

Therefore, when the cooling flag J is 0, since the windshield is not clouded, the program proceeds to next step S460 for allowing the hot gas heater cycle H to carry out the maximum heating mode operation.

Figure 14:
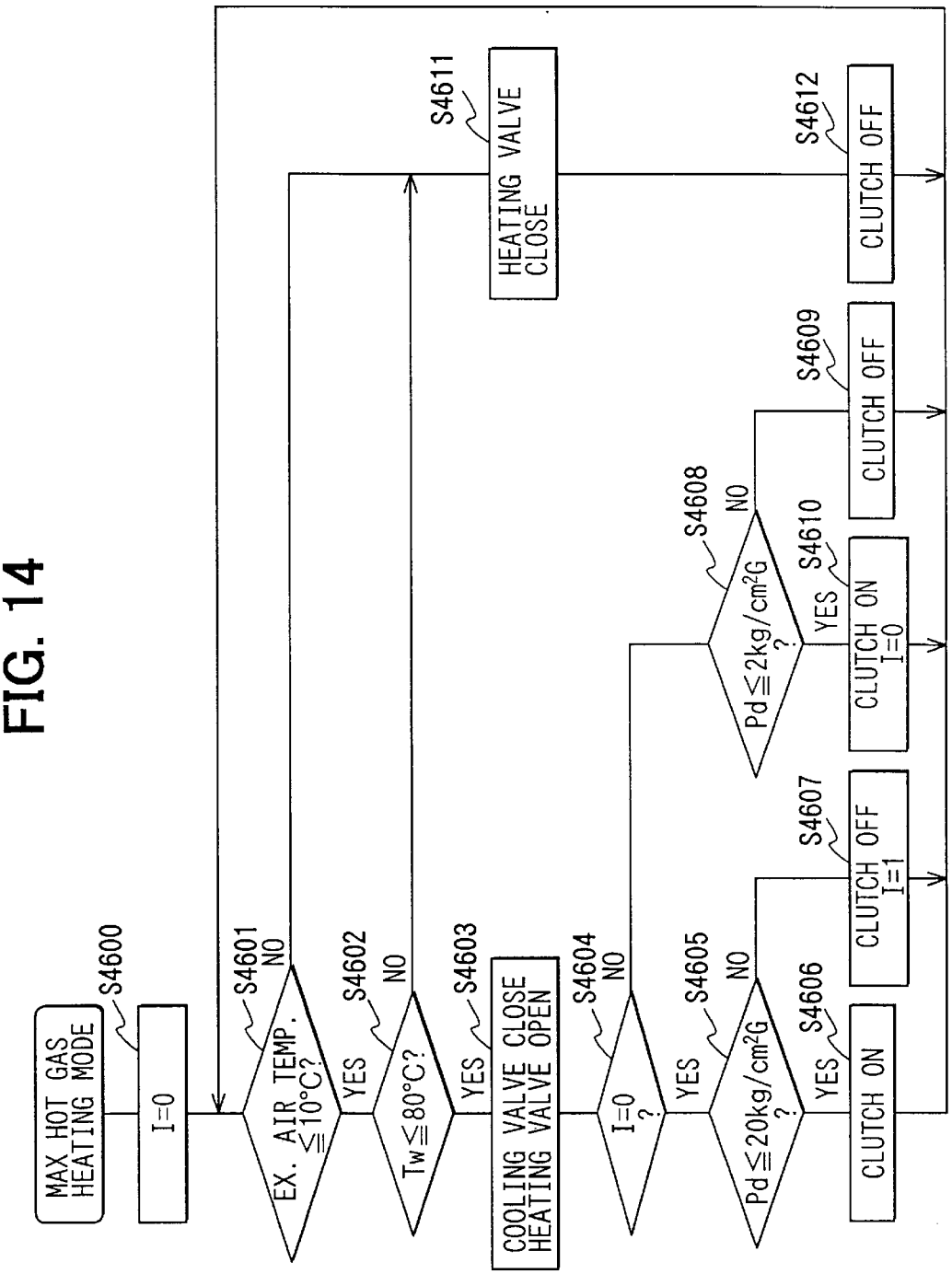
FIG. 14 is a control flowchart showing an example of S460 in FIG. 13.

FIG. 14 shows an example of the maximum hot gas heater hearting mode at the step S460. At step S460, the flag I is initialized to 0. Next, step S4601 determines whether external air temperature is less than a first predetermined temperature (fir example, 10° C.) or not. When the external air temperature is less than the first predetermined temperature, step S4602 determines whether engine water temperature is less than a predetermined temperature (for example, 80° C.) or not.

When the engine water temperature is less than the predetermined temperature, at step S4604, the cooling electromagnetic valve 41a is closed, and the heating electromagnetic clutch 41b is opened. Next, step S4604 determines whether the flag I is 0 or not. When the determination is the first after the hot gas switch 33 is made on, since the flag I is 0, the program proceeds to step S4605 for determining whether the discharge pressure Pd of the compressor 11 is less than a first predetermined pressure (for example, 20 kg/cm$^2$G) or not.

When the discharge pressure Pd is less than the first predetermined pressure, the program proceeds to step S4606 for energizing the electromagnetic clutch 11a to operate the compressor 11. On the other hand, at the step S4605, when the discharge pressure Pd of the compressor 11 is more than the predetermined pressure, the program proceeds to step S4607 for disenergizing the electromagnetic clutch 11a to stop the compressor 11, and set the flag I to 1.

Here, in the eighth embodiment, operation of compressor 11 intermits based on the discharge pressure Pd, so that heating mode performance of the hot gas heater cycle is controlled. When the discharge pressure Pd is over the first predetermined pressure, the compressor 11 is stopped for controlling the heating performance and preventing cycle high pressure from increasing abnormally.

Then, since the flag is set to 1 at step S4607, next step S4604 determines "NO", and the program proceeds to step S4608 for determining whether the discharge pressure Pd of the compressor 11 is less than a second predetermined pressure (for example, 2 kg/cm$^2$G) or not. Until the discharge pressure Pd decreases lower than the second predetermined pressure, the program proceeds from the step S4608 to step S4610 for maintaining the OFF state of the electromagnetic clutch 11a.

Then, when the discharge pressure Pd decreases lower than the second predetermined pressure, the program proceeds from the step S4608 to step S4610 for energizing the electromagnetic clutch 11a to operate the compressor 11 again, and setting the flag I to 0. Thereby, the program proceeds from the step S4604 to step S4605, S4606 for maintaining the operation state of the compressor until the discharge pressure Pd exceeds the first predetermined pressure.

Here, when the external air temperature is over 10° C. at step S4601, and the engine water temperature is over 80° C. at step S4602, since the heating mode by the hot gas heater cycle is not required, the program proceeds to step S4611 for closing the heating electromagnetic valve 41b, and to step S4612 for disenergizing the electromagnetic clutch 11a to stop the compressor 11.

Further, during the heating mode of the hot gas heater cycle, since the external air temperature is within a low temperature region under 10° C., the discharge pressure Pd abruptly decreases due to the stop of the compressor 11. Thus, a large pressure difference is set between the first predetermined pressure (for example, 20 kg/cm$^2$G) for stopping the compressor and the second predetermined pressure (for example, 2 kg/cm$^2$G) for operating the compressor 11 again, thereby suppressing a hunting of the compressor 11.

Next, in the control routine in FIG. 13, when step S450 determines "NO" (cooling operation flag J is 1), since the cooling operation was carried out at the last air conditioning operation, drain water sticks to the surface of the indoor heat exchanger 15. Thus, the heating operation of the hot gas heater cycle H might cause a re-evaporation of the drain water on the surface of the indoor heat exchanger 15, thereby introducing fog on the windshield grass.

In this case, the program proceeds to step S455 at first, and determines whether a period t after the start of the hot gas heating mode has passed more than a predetermined period t0 or not.

The predetermined period t0 is a hot gas heating operation time required for completion of drain water evaporation on the surface of the indoor heat exchanger 15. Here, the drain water evaporates due to the heat radiation of the indoor heat exchanger 15 during the hot gas heating mode. The predetermined period t0 can be set to constant value attained by experiments. However, an actual amount of the drain waiter sticking to the indoor heat exchanger 15 becomes large as the last cooling operation period is longer and a period from the last cooling operation stop to the current hot gas heating operation start is shorter. Thus, the above-described hot gas heating required operation period t0 is desired to be set longer as the last cooling operation period is longer and the period from the last cooling operation stop to the current hot gas heating operation start is shorter.

Figure 15:
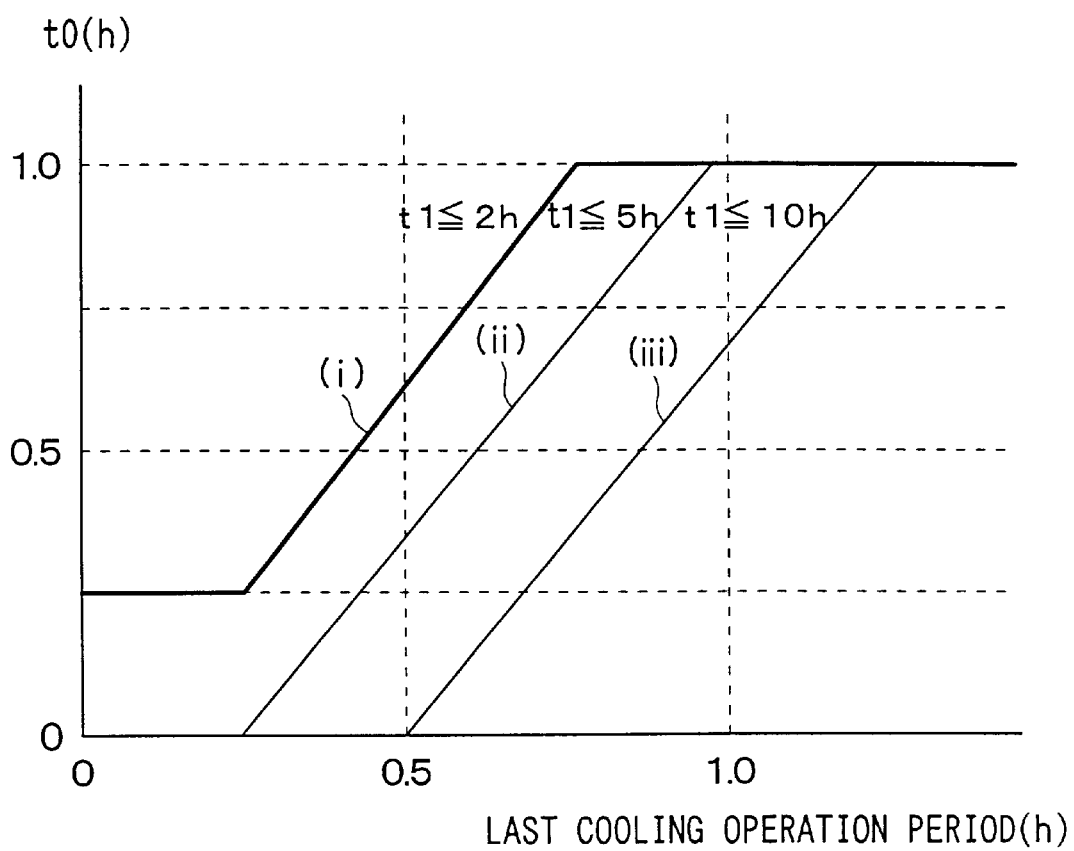
FIG. 15 is a control characteristic map in the eighth embodiment.

FIG. 15 is a characteristic map determining the hot gas heating required operation period t0, (i) shows a characteristic where a period t1 from the last cooling operation stop to the current hot gas heating mode start is less than 2 hours, (ii) shows a characteristic where the period t1 is more than 2 hours and less than 5 hours, and (iii) shows a characteristic where the period t1 is more than 5 hours and less than 10 hours.

When step S455 determines that the period t after the hot gas heating mode start is less than the predetermined period t0, the program proceeds to step S470 for operating the hot gas heating mode. The hot gas heating mode at step S470 might introduce fog on the windshield, so that a heating performance restricting control is included for preventing the fog.

Figure 16:
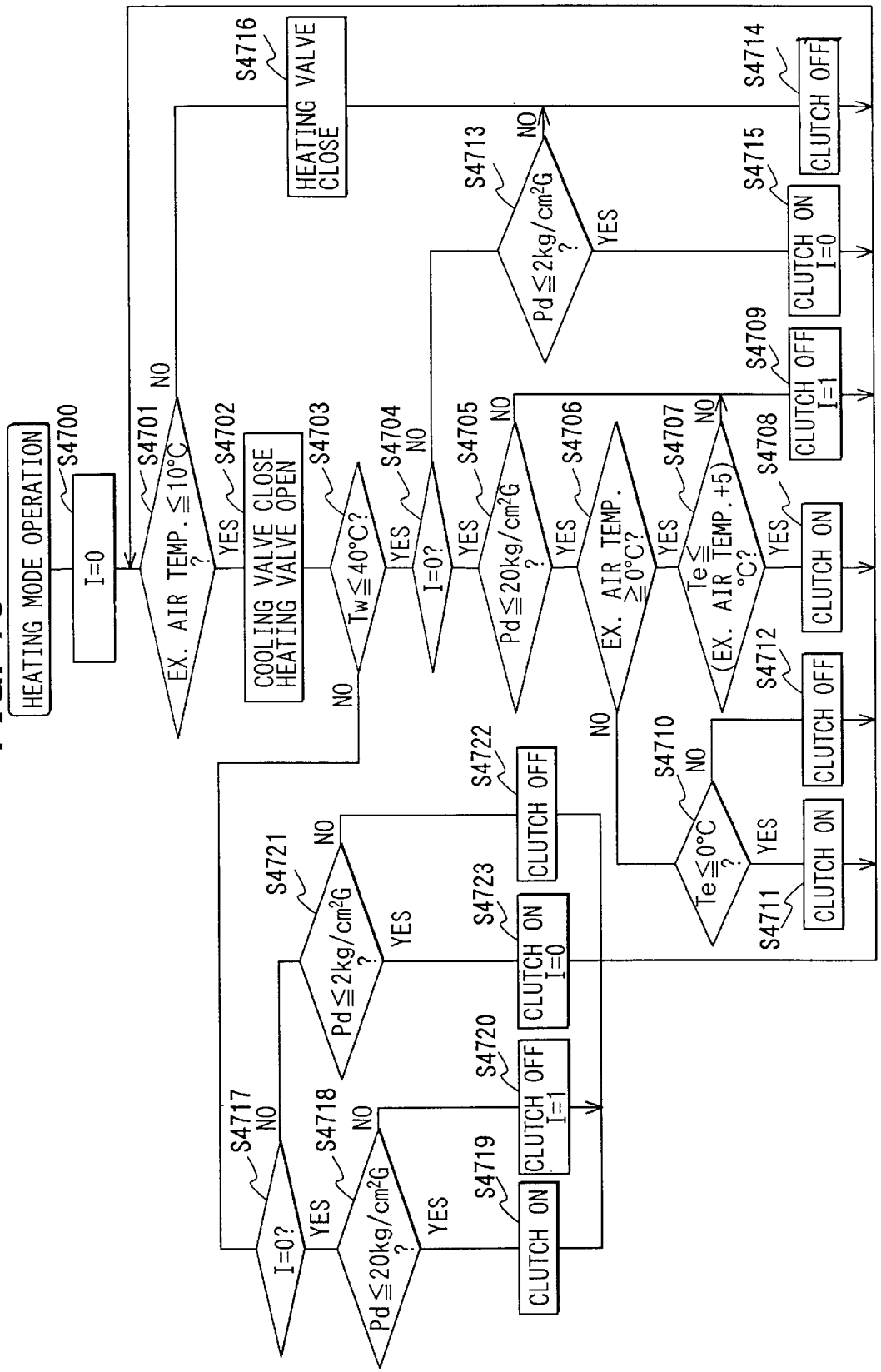
FIG. 16 is a control flowchart showing an example of S470 in FIG. 13.

FIG. 16 shows an example of a control at the step S470. First, at the step S470, the flag I is initialized to 0. Next, step S4701 determines the external air temperature is less than a first predetermined temperature (for example, 10° C.) or not. When the external air temperature is less than the first predetermined temperature, step S4702 closes the cooling electromagnetic valve 41a and opens the heating electromagnetic valve 41b. Next, step S4703 determines the engine water temperature is less than a predetermined temperature (for example, 40° C.) or not.

The step S4703 determines whether the condition causes a fog on the windshield or not. That is, as a temperature of vehicle windshield is lower, absolute humidity reaching a dew point when vehicle inside air touches the windshield becomes low, thereby generating the fog. Therefore, whether the windshield is clouded or not is determined based on the windshield temperature.

In an automotive air-conditioner, since defroster blown air temperature changes in accordance with temperature of the engine water introduced into the heater core 21, there is a correlation between the engine water temperature and the windshield grass temperature. In the present eighth embodiment, when the engine water temperature TW is less than a predetermined temperature (for example, 40° C.), the ECU determines that the windshield will be clouded because the windshield grass temperature is low. Contrary to this, when the engine water temperature TW is over the predetermined temperature (for example, 40° C.), the ECU determines that the windshield grass will not be clouded because the blown air temperature and the windshield grass will be increased.

When the step S4704 determines that the engine water temperature TW is less than the predetermined temperature (for example, 40° C.), since the windshield grass might be clouded, a heating performance restricting control described hereinafter is carried out for preventing the windshield from being clouded.

First, step S4704 determines whether the flag I is 0 or not. When the determination is a first determination after the hot gas switch 33 is made on, since the flag I is 0, the program proceeds to step S4705 for determining the discharge pressure Pd of the compressor 11 is less than a first predetermined value (for example, 20 kg/cm$^2$G) or not.

When the discharge pressure Pd is less than the first predetermined pressure, the program proceeds to step S4706 for determining the external air temperature is more than a second predetermined value (for example, 0° C.) or not. When the external air temperature is more than second predetermined value, step S4707 determines whether a temperature Te of the indoor heat exchanger 15 (for example, temperature of blown air having passed through the indoor heat exchanger) is lower than a first predetermined temperature or not. Here, the first predetermined temperature is set to external air temperature plus 5° C.

When the indoor heat exchanger temperature Te is lower than the first predetermined temperature, the program proceeds to step S4708 for energizing the electromagnetic clutch 11a to operate the compressor 11. On the other hand, when the indoor heat exchanger temperature Te is more than the first predetermined temperature, the program proceeds to step S4707 for disenergizing the electromagnetic clutch 11a to stop the compressor 11. Simultaneously, the flag I is set to 1.

Further, the step S4706 determines that the external air temperature is lower than the second predetermined value, the program proceeds to step S4710 for determining the indoor heat exchanger temperature Te is lower than the second predetermined temperature. Here, the second predetermined temperature is set to 0° C. in the present embodiment. When the indoor heat exchanger temperature Te is less than the second predetermined temperature, the program proceeds to step S4711 for energizing the electromagnetic clutch 11a to operate the compressor 11. On the other hand, when the indoor heat exchanger temperature Te is more than the second predetermined temperature, the program proceeds to step S4712 for disenergizing the electromagnetic clutch 11a to stop the compressor 11.

When the step S4705 determines the discharge pressure Pd of the compressor 11 is more than the first predetermined value, the program proceeds to step S4709 for disenergizing the electromagnetic clutch 11a to stop the compressor 11. Simultaneously, the flag I is set to 1.

At the step S4709, when the flag I becomes 1, next step S4704 determines "NO", and the program proceeds to step S4713 for determining whether the discharge pressure Pd of the compressor 11 is less than a predetermined pressure (for example, 2 kg/cm$^2$G) or not.

Until the discharge pressure Pd decreases lower than the second predetermined pressure, the program proceeds from step S4713 to step S4714 for maintaining the OFF state of the electromagnetic clutch 11a.

When the discharge pressure Pd decreases lower than the second predetermined pressure the program proceeds from step S4713 to step S4715 for energizing the electromagnetic clutch 11a to operate the compressor 11 again, and the flag I is set to 0. In this way, the program proceeds from the step S4704 to the step S4705, and the compressor 11 keeps on operating until the discharge pressure Pd exceeds the first predetermined value.

Here, when the step S4701 determines that the external air temperature is more than 10° C., since the heating mode of the hot gas heater cycle is not required, the program proceeds to step S4716 for closing the heating electromagnetic valve 41b and the electromagnetic clutch 41b is disenergized at step S4714 to stop the compressor 11.

On the other hand, at step S4703, the engine water temperature is over 40° C., since the fog on the windshield is not worried, the maximum hot gas heating mode is carried out as shown in FIG. 14. That is, when the engine water temperature is more than 40° C., step S4703 determines "NO", and the compressor 11 intermits in accordance with only the discharge pressure Pd at steps S4717–S47123 for controlling the heating mode performance.

The performance control of the heating mode is the same as the performance control at steps S4605–S4610 in FIG. 14. Since the restricting control of the indoor heat exchanger temperature Te is not carried out, the maximum hot gas heating mode is executed.

As described above, FIG. 16 shows a performance restricting control in which the compressor 11 is controlled to intermit during the heating mode for restricting the temperature of the indoor heat exchanger 15, and a maximum performance operation control in which the indoor heat exchanger temperature Te is not restricted. These are summarized as follows.

(1) while the engine water temperature is less than 40° C. and the windshield might be clouded, (i) 0° C.≦external air temperature≦10° C.

Steps S4707, S4708, S4709 control the compressor 11 to operate intermittently for adjust the indoor heat exchanger temperature to be external air temperature plus 5° C. Thereby, fog on the vehicle windshield is effectively prevented.

During heating operation in winter, external air is generally introduced into the air-conditioning case 18 and passes through the indoor heat exchanger 15. The temperature of the indoor heat exchanger 15 is controlled to be lower than a temperature being slightly higher than the external air temperature (external air temperature plus 5° C.), so that introduced air temperature rises by small amount (+5° C.). Thus, reduction of relative humidity of the introduced external air is small. Thereby, re-evaporation of drain water kin the indoor heat exchanger 15 is suppressed.

Since the windshield is directly exposed to the external air, the temperature thereof is almost the same as or slightly higher than the external air temperature. Thus, by controlling the temperature of the indoor heat exchanger 15 to be a little higher than the external air temperature (external air temperature plus 5° C.), even when the air blown through the defroster air outlet 49 contacts the windshield grass and cooled to the temperature of the windshield, the blown air is not saturated, so that the windshield is not clouded.

When the heating mode is carried out by introducing the external air into the air-conditioning case 18, the temperature of the indoor heat exchanger 15 is controlled to the external air temperature plus 5° C. while the external air temperature rises over 0° C. Thereby, heating load of the heater core 21 is reduced by the temperature rise +5° C., so that the heating performance inside the vehicle cabin is improved.

(ii) external air temperature≦0° C.

Steps S4710, S4711, S4712 controls the compressor 11 to operate intermittently so that the indoor heat exchanger temperature becomes 0° C. Thus, drain water frosted in the indoor heat exchanger 15 is prevented from melting and evaporating, so that fog on the windshield due to the drain water evaporation is prevented.

At a cold district, the heating mode is used at −30° C. through −20° C. In this case, when the heating mode of the hot gas heater cycle is carried out, temperature of the air introduced into the air-conditioning case 18 is increased from −30° C. through −20° C. to 0° C. by heat radiated from the gas refrigerant, thereby improving the heating performance inside the vehicle cabin by the temperature rise.

(2) when the engine water temperature is over 40° C., and the windshield is not clouded Steps S4717–S4723 operates the compressor 11 intermittently in accordance with only the discharge pressure Pd for controlling the heating mode performance. That is, the maximum heating mode operation not to restrict the indoor heat exchanger temperature Te is carried out.

In FIG. 13, when step S455 determines the period t after the hot gas heating mode start has passed more than the predetermined period t0, the program proceeds to step S490 to set the flag J to 0. After that, step S450 always determines "YES", and step S460 carries out the maximum heating operation of the hot gas heating mode.

Here, when the hot gas heating mode is not designated, step S440 determines "NO", step S500 stops the hot gas heating mode. That is, the heating electromagnetic valve 41b is closed and the electromagnetic clutch 11a is disenergized to stop the compressor 11.

In the eighth embodiment, when the engine 22 stops before a hot gas heating mode period t1 reaches the predetermined period t0, the hot gas heating mode is compulsorily stopped before the drain water in the indoor heat exchanger 15 completely evaporates. Thus, in this case, as the hot gas heating mode period t1 is longer, the predetermined period t0 may be corrected longer.

Modifications

In the first to fifth embodiments, the compressor 11 is an electric compressor and the air outlet temperature Te of the indoor heat exchanger 15 is controlled with the control for the RPM of the compressor 11 as an example. But, in the sixth and seventh embodiments, the compressor 11 can be driven with the vehicle engine 22 via the electro-magnetic clutch and the air outlet temperature Te of the indoor heat exchanger 15 is controlled by turning ON/OFF compressor 11 with the electro-magnetic clutch. Moreover, when compressor 11 is a variable capacitance type compressor that can change the exiting amount of coolant, the air outlet temperature Te of the indoor heat exchanger 15 may be controlled with the control for exiting coolant of compressor 11.

In addition, the opening angle of decompressing apparatus 14 can be electrically controlled, the coolant temperature of the indoor heat exchanger 15 can be adjusted by adjusting the high pressure side pressure during heating depending on the opening angle control of this decompressing apparatus 14 and thereby the air outlet temperature Te of the indoor heat exchanger 15 is controlled.

Moreover, temperature of the indoor heat exchanger 15 can be controlled by detecting the surface temperature of a indoor heat exchanger 15 fin instead of the air outlet temperature Te of the indoor heat exchanger 15. Moreover, in the first to fifth embodiments, hot water supplied from the vehicle engine 21 circulates through the heater core 21, but it is also possible in a vehicle loading a fuel battery that the cooling water (hot-water) of a fuel battery circulates through the heater core 21.

In above embodiments, the manual setting system has been explained in which the air cooling mode is set by turning ON the air-conditioning (air cooling) switch 32 (FIG. 1) and the air heating mode is set by turning ON the air heating switch 33 (FIG. 1), but in the case of automatically controlling a vehicle compartment temperature with an electronic control apparatus 25 for air-conditioning, a target air outlet temperature is calculated based on the thermal load condition of vehicle and setting temperature and a temperature adjusting means such as the air-mixing door 23 or the like is also controlled to attain the target temperature of the air blowing into the vehicle compartment. Therefore, it is also possible that the air heating mode is set automatically in the area where the target air outlet temperature is higher than the predetermined temperature and the air cooling mode is also set automatically in the area where the target air outlet temperature is lower than the predetermined temperature.

While the above-described embodiments refer to examples of usage of the present invention, it is understood that the present invention may be applied to other usage, modifications and variations of the same, and is not limited to the disclosure provided herein.

What is claimed is:

1. An air conditioning apparatus for a vehicle, said air-conditioning apparatus comprising:
    an air-conditioning case through which air flows toward a vehicle compartment;
    a heat pump system including an indoor heat exchanger provided within the air-conditioning case, a compressor that adjusts an amount of exiting coolant, and a valve which allows said indoor heat exchanger to operate as a low pressure side heat exchanger during an air cooling operation of the heat pump system, and allows said indoor heat exchanger to operate as a high pressure side heat exchanger during a heating operation of the heat pump system;

a heater core positioned downstream of the indoor heat exchanger, the heater core heating air coming from the indoor heat exchanger by using hot water heated with waste heat of the vehicle; and a control unit that controls a temperature of the indoor heat exchanger by operating the compressor of the heat pump system, wherein:

the control unit determines whether a window glass of the vehicle is fogged, the control unit controls the temperature of the indoor heat exchanger at or below a first predetermined temperature when the heat pump system is operated under the heating operation and the window glass is determined to be fogged, the control unit controls the temperature of the indoor heat exchanger at a certain temperature higher than the first predetermined temperature and lower than a second predetermined temperature when the heat pump system is operated under the heating operation and the window glass is determined to be not fogged, the first predetermined temperature is set to suppress re-evaporation of condensed water on the indoor heat exchanger, and the second predetermined temperature is set to correspond to an assured resistance pressure of the indoor heat exchanger when the indoor heat exchanger is the low pressure side heat exchanger.

2. The air-conditioning apparatus for the vehicle according to claim 1, further comprising:

a first sensor that detects a quantity representing an air humidity in the vehicle compartment near the window glass, wherein the control unit determines whether the window glass is fogged based on the detected quantity.

3. The air-conditioning apparatus for the vehicle according to claim 2, wherein the quantity is a water temperature of water in the heater core, and the control unit determines whether the window glass is fogged when the water temperature is lower than a predetermined water temperature.

4. The air-conditioning apparatus for the vehicle according to claim 3, further comprising:

a second sensor that detects an external air temperature, wherein the control unit compensates the predetermined water temperature so that the predetermined water temperature is increased as the external air temperature decreases.

5. The air-conditioning apparatus for the vehicle according to claim 1, further comprising:

means for recording a cooling history of the indoor heat exchanger, wherein the control unit determines whether the window glass is fogged based on the recorded cooling history of the indoor heat exchanger.

6. The air-conditioning apparatus for the vehicle according to claim 1, wherein the heat pump system is stopped when the control unit determines that the window glass is not fogged.

7. The air-conditioning apparatus for the vehicle according to claim 1, wherein the first predetermined temperature is 10° C.

8. The air-conditioning apparatus for the vehicle according to claim 1, wherein the heat pump system uses $CO_2$ as the coolant.

9. The air-conditioning apparatus for the vehicle according to claim 1, wherein the indoor heat exchanger is designed as the low pressure heat exchanger so that the indoor heat exchanger withstands up to the assured resistance pressure.

10. An air-conditioning apparatus for a vehicle having a window glass, said air-conditioning apparatus comprising:

an air-conditioning case through which air flows;

a heat pump system including an indoor heat exchanger disposed within said air conditioning case, a compressor and a valve movable between a first position where said indoor heat exchanger operates as a low pressure heat exchanger during an air cooling operation and a second position where said indoor heat exchanger operates as a high pressure side heat exchanger during a heating operation, said heat pump system defining an assured resistance pressure for said indoor heat exchanger when said indoor heat exchanger operates as said low pressure side heat exchanger;

means for determining if the window glass of the vehicle is fogged;

a control unit for controlling an operating temperature of said indoor heat exchanger within a first and a second temperature range by controlling output of said compressor, said first temperature range being at or below a first predetermined temperature when said indoor heat exchanger operates as said high pressure side heat exchanger and said determining means determines that said window glass is fogged, said second temperature range being between said first predetermined temperature and a second predetermined temperature higher than said first predetermined temperature when said indoor heat exchanger operates as said high pressure side heat exchanger and said determining means determines that said window glass is not fogged, said second predetermined temperature corresponding to said assured resistance pressure of said indoor heat exchanger.

* * * * *